United States Patent
McCaffrey et al.

(10) Patent No.: US 8,834,276 B2
(45) Date of Patent: *Sep. 16, 2014

(54) RULES-BASED ENGINE FOR CROSS-PROMOTION PLATFORM

(71) Applicant: Zynga Inc., San Francisco, CA (US)

(72) Inventors: Daniel McCaffrey, San Bruno, CA (US); Yan Zhang, Foster City, CA (US); Cadir Lee, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/793,637

(22) Filed: Mar. 11, 2013

(65) Prior Publication Data

US 2013/0324259 A1    Dec. 5, 2013

Related U.S. Application Data

(60) Provisional application No. 61/654,506, filed on Jun. 1, 2012.

(51) Int. Cl.
  *A63F 13/12*    (2006.01)
  *A63F 13/30*    (2014.01)

(52) U.S. Cl.
  CPC ..................................... *A63F 13/12* (2013.01)
  USPC ......................................................... 463/42

(58) Field of Classification Search
  CPC ........ A63F 13/12; A63F 2300/55–2300/5593; H04L 29/06034
  USPC ........................................ 463/42; 705/14.12
  See application file for complete search history.

(56) References Cited

U.S. PATENT DOCUMENTS

| | | | | |
|---|---|---|---|---|
| 6,571,216 | B1* | 5/2003 | Garg et al. | 705/14.25 |
| 2004/0166931 | A1* | 8/2004 | Criss-Puszkiewicz et al. | 463/29 |
| 2006/0281541 | A1* | 12/2006 | Nguyen et al. | 463/25 |
| 2006/0287106 | A1* | 12/2006 | Jensen | 463/42 |
| 2008/0090628 | A1* | 4/2008 | Mueller et al. | 463/1 |
| 2010/0146502 | A1* | 6/2010 | Zalewski | 718/1 |
| 2011/0250949 | A1* | 10/2011 | van Os et al. | 463/25 |
| 2012/0315993 | A1* | 12/2012 | Dumont et al. | 463/42 |
| 2013/0143669 | A1* | 6/2013 | Muller | 463/42 |
| 2013/0151342 | A1* | 6/2013 | Citron et al. | 705/14.64 |
| 2013/0324260 | A1 | 12/2013 | Mccaffrey et al. | |
| 2013/0324261 | A1 | 12/2013 | Mccaffrey et al. | |
| 2013/0339228 | A1* | 12/2013 | Shuster et al. | 705/40 |

* cited by examiner

*Primary Examiner* — William Brewster
*Assistant Examiner* — Jason Skaarup
(74) *Attorney, Agent, or Firm* — Schwegman Lundberg & Woessner, P.A.

(57) ABSTRACT

A system and computer-implemented method for cross-promoting electronic games is provided. First and second electronic game databases are configured to store first and second game user attributes relating to first and second electronic game, respectively. An aggregator database is coupled to the first and second electronic game databases and is configured to store a first game user attribute, associated with the user and relating to a first electronic game, and user data of a user of the first electronic game. A processor is coupled to the aggregator database and configured to automatically associate a second game user attribute to the user according to a predetermined rule based on at least one of the first game user attribute stored in the aggregator database and the user data. The second game user attribute associated to the user by the processor is stored in the aggregator database.

32 Claims, 12 Drawing Sheets

RULES-BASED ENGINE FOR CROSS-PROMOTION PLATFORM

CLAIM OF PRIORITY

This patent application claims the benefit of priority, under 35 U.S.C. Section 119(e), to U.S. Provisional Patent Application Ser. No. 61/654,506, entitled "Rules-based Engine for Cross-promotion Platform," filed on Jun. 1, 2012, which is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Zynga Incorporated. All Rights Reserved.

TECHNICAL FIELD

The present disclosure generally relates to promotion of electronic games and, in particular embodiments, a rules-based engine for a cross-promotion platform.

BRIEF DESCRIPTION OF THE DRAWINGS

Some embodiments are illustrated by way of example and not limitation in the figures of the accompanying drawings.

DETAILED DESCRIPTION

Figure 1:
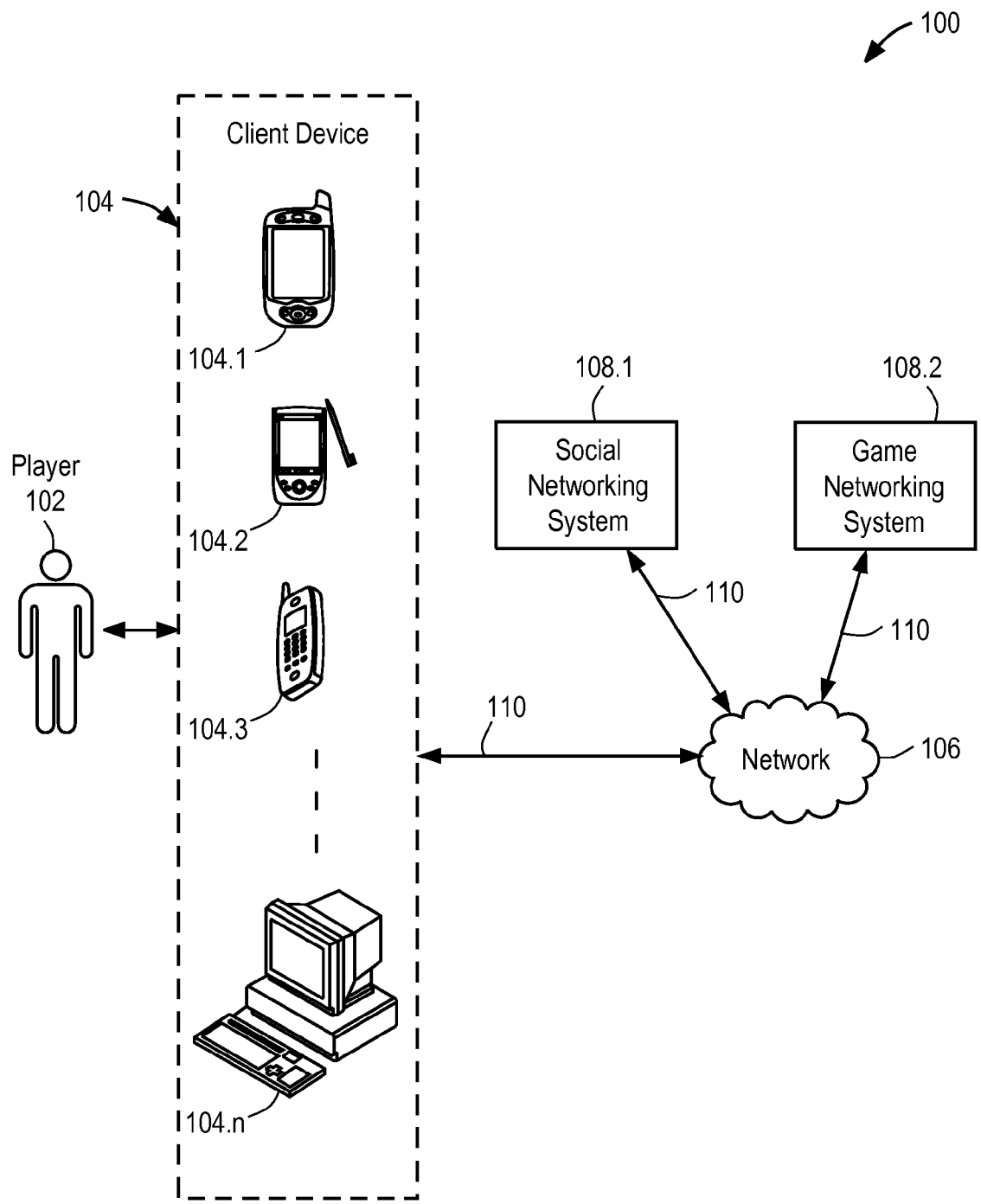
FIG. 1 is a schematic diagram showing an example of a system.

Although the aspects of the present disclosure are described below with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

In the following description, for purposes of explanation, numerous specific details are set forth in order to provide an understanding of various embodiments of the inventive subject matter. It will be evident, however, to those skilled in the art that embodiments may be practiced without these specific details. Further, to avoid obscuring the inventive concepts in unnecessary detail, well-known instruction instances, protocols, structures, and techniques have not been shown in detail. As used herein, the term "or" may be construed in an inclusive or exclusive sense, the term "user" may be construed to include a person or a machine, and the term "interface" may be construed to include an application program interface (API) or a user interface.

Electronic games are well known in the art and can take many forms. Certain games present puzzles to be solved by individual players or groups of players. Various games simulate realistic or fantasy environments and allow players to interact with the simulated environment in various ways. Electronic games can be presented to players in isolation, with the actions of one player not affecting the playing experience of another player, or electronic games can be presented as online multiplayer games where players can interact with other players and the actions of one player can impact the play of other players.

A provider of a first electronic game can seek to promote the playing of the first game through a second electronic game. A user of the second game can be prompted with an offer or enticement to play the first game. The offer can be based on a variety of factors which can be individually selected given the circumstances of the offer and the degree to which use of the first game is desired to be promoted.

Electronic games can operate on the basis of an engine, including instruction sets that regulate the game play, display graphics, and so forth. The underlying engines which run various games are not necessarily the same or similar, and in some cases a particular game may operate on the basis of an engine that is unique to that particular game. Consequently, the operation of the first game may not have an analogue to the operation of the second game. As a result, the desire to promote the first game by way of the second game can be somewhat limited, variably by the scope of the possible promotional efforts, the speed and flexibility with which promotional offers can be generated, and the availability of information from the first game and the second game for deciding on an implementing promotional efforts.

Example System

FIG. 1 is a schematic diagram showing an example of a system 100 for implementing various example embodiments. In some embodiments, the system 100 comprises a player 102, a client device 104, a network 106, a social networking system 108.1, and a game networking system 108.2. The components of the system 100 may be connected directly or over a network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, any other type of network, or a combination of two or more such networks.

The client device 104 may be any suitable computing device (e.g., devices 104.1-104.*n*), such as a smart phone 104.1, a personal digital assistant (PDA) 104.2, a mobile phone 104.3, a personal computer 104.*n*, a laptop, a computing tablet, or any other device suitable for playing a virtual game. The client device 104 may access the social networking system 108.1 or the game networking system 108.2 directly, via the network 106, or via a third-party system. For example, the client device 104 may access the game networking system 108.2 via the social networking system 108.1.

The social networking system 108.1 may include a network-addressable computing system that can host one or more social graphs (see for example FIG. 2), and may be accessed by the other components of system 100 either directly or via the network 106. The social networking system 108.1 may generate, store, receive, and transmit social networking data. Moreover, the game networking system 108.2 may include a network-addressable computing system (or systems) that can host one or more virtual games, for example, online games. The game networking system 108.2 may generate, store, receive, and transmit game-related data, such as, for example, game account data, game input, game state data, and game displays. The game networking system 108.2 may be accessed by the other components of system 100 either directly or via the network 106. The player 102 may use the client device 104 to access, send data to, and receive data from the social networking system 108.1 and/or the game networking system 108.2. In various example embodiments, the game networking system 108.2 may include an introduction mechanic that can introduce a player of the game networking system 108.2 to other players of the game networking system 108.2 that are encountering a common in-game obstacle.

Although FIG. 1 illustrates a particular example of the arrangement of the player 102, the client device 104, the social networking system 108.1, the game networking system 108.2, and the network 106, this disclosure includes any suitable arrangement or configuration of the player 102, the client device 104, the social networking system 108.1, the game networking system 108.2, and the network 106.

Figure 2:
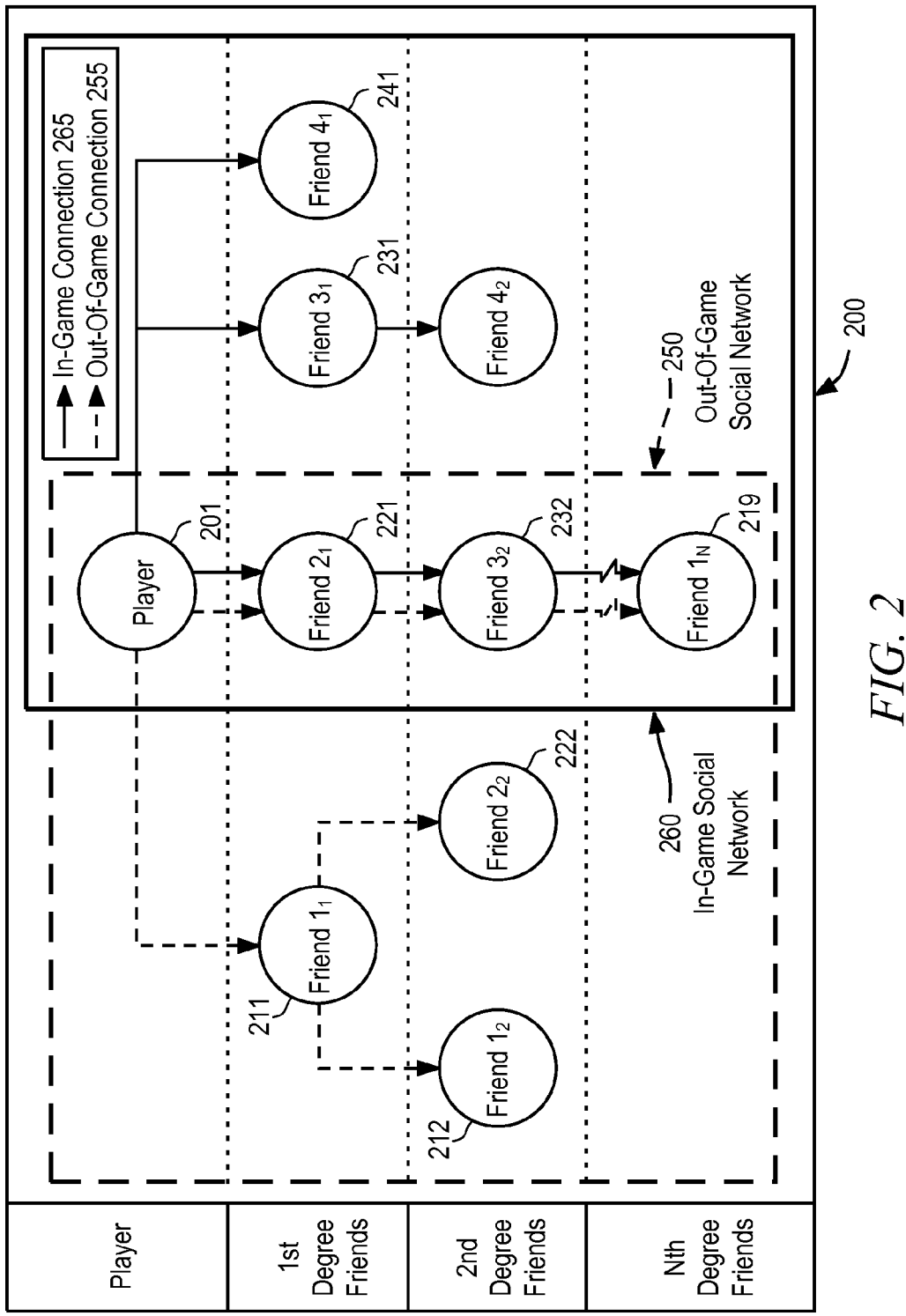
FIG. 2 is a schematic diagram showing an example of a social network within a social graph.

FIG. 2 is a schematic diagram showing an example of a social network within a social graph 200. The social graph 200 is shown by way of example to include an out-of-game social network 250, and an in-game social network 260. Moreover, in-game social network 260 may include one or more players that are friends with Player 201 (e.g., Friend 231), and may include one or more other players that are not friends with Player 201. The social graph 200 may correspond to the various players associated with one or more virtual games.

Example Cross Promotional System

Figure 3:
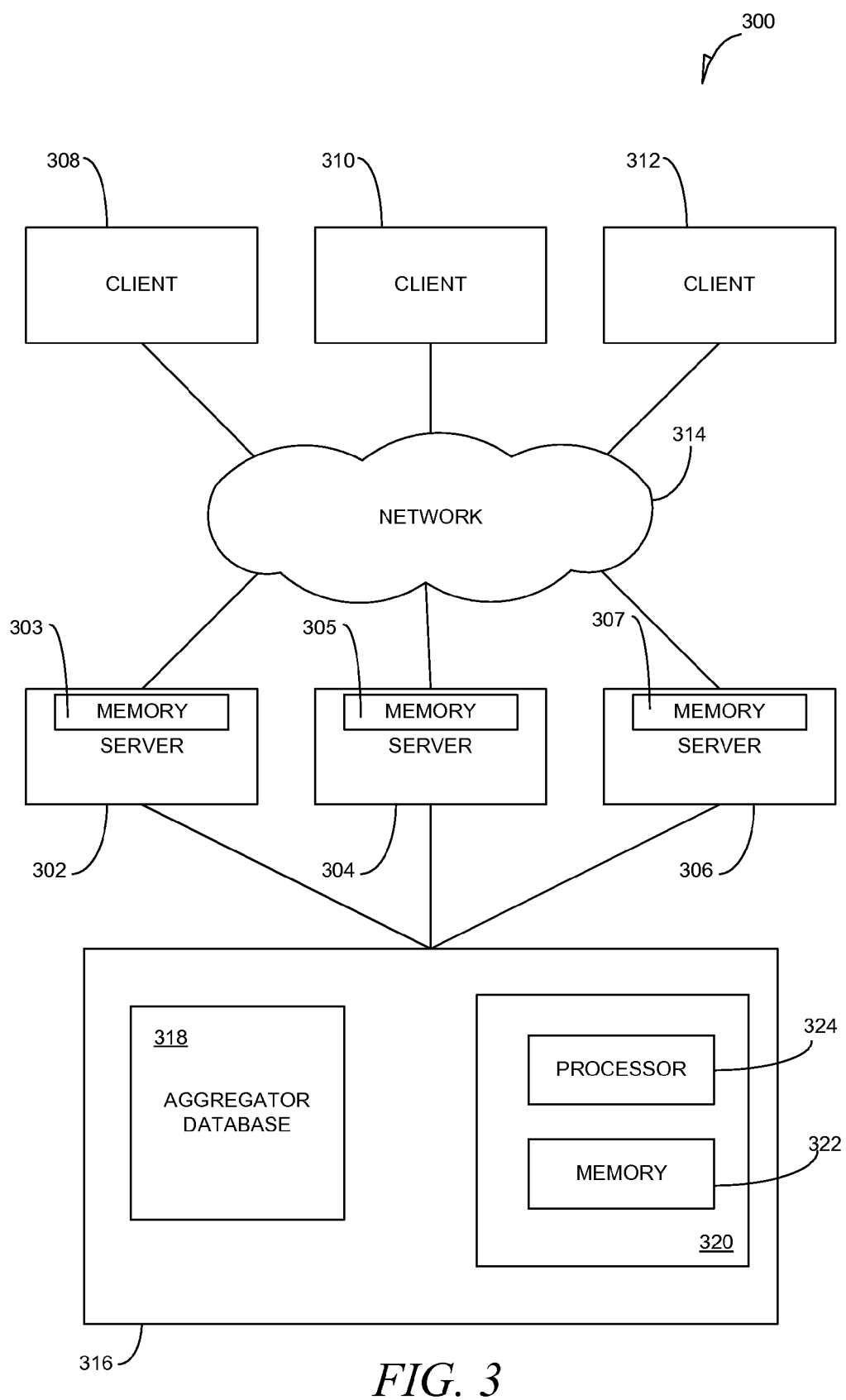
FIG. 3 is a block diagram of a system incorporating multiple game servers implementing electronic games.

FIG. 3 is a block diagram of a system 300 incorporating multiple game servers 302, 304, 306 implementing electronic games. The system 300 can incorporate the system 100, operate in tandem with the system 100, or operate independently of the system 100. The system 300 can provide automated cross promotions. A front end user interface, such as a web-based graphical user interface (GUI) can register cross-promotional rules and rewards. Rewards in this context can include electronic game virtual items or rewards that can be utilized across a variety of electronic games, such as points for redemption at a later time. A user can be presented with a list of cross-promotional offers or events and can select which events the user would like to join. The system 300 can track the users' progress and rewards. When a user completes a cross-promotion, the system 300 can notify the user and credit a reward to the user, in an example when the user next plays an electronic game in which the user accepted the offer In an example, each server 302, 304, 306, such as may be included in the game networking system 108.2, implements a different electronic game and incorporates a memory device 303, 305, 307, respectively, configured to store game data related to the corresponding electronic game for the respective servers 302, 304, 306. The memory devices 303, 305, 307 can be any of a variety of forms of electronic storage known in the art, such as non-volatile storage, including hard disks and flash memory, and volatile memory, such as random access memory (RAM). Game data can include any data related to the electronic game, and can including static data related to playing the game, such as game rules and graphic rendering, as well as metadata of the game, such as a name and software version. Game data can further include user metrics or user attributes related to a status of a player of the electronic game obtained as a result of playing the electronic game, such as virtual items obtained and levels of attainment within the electronic game, as well as statistical information, such as an amount of time the user has played the electronic game.

The servers 302, 304, 306 and memory devices 303, 305, 307 can be separately provided. In an example, the servers 302, 304, 306 and memory devices 303, 305, 307 can be provided on the same individual server or cluster of servers. The memory devices 303, 305, 307 can be a common memory device with separate file structures or logical divisions.

Each server 302, 304, 306 provides the electronic game to various client systems 308, 310, 312, such as may be utilized by a player 102 and be implemented on devices 104, of the respective electronic games. Each game can be provided to the respective players via a network 314, which may be coextensive with or separate from the network 106. The components of the system 300 can be communicatively connected with respect to other in any suitable configuration, using any suitable type of connection. For example, as with the network 106, portions of the network 314 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

The game servers 302, 304, 306 can be network-addressable computing systems that can each host one or more electronic games. The game servers 302, 304, 306 can generate, store, receive, and transmit game-related data, such as, for example, game account data, game input, game state data, and game displays. The game servers 302, 304, 306 can be accesses by the other components of the system 300 either directly or via the network 314. Client systems 308, 310, 312 can access, send data to, and receive data from the game servers 302, 304, 306.

The client systems 308, 310, 312 can be a variety of types and configurations of computing devices that can be configured for executing instructions in connection with an electronic game provided by the game servers 302, 304, 306. The computing devices can include, but are not limited to, personal computers of various types and mobile computing devices, including portable, self-powered devices such as smart phones, personal digital assistants (PDAs), media players, and tablet computers. The electronic games may be provided to users on the client systems 308, 310, 312 through either a standalone software application, or as an internet-based game (for example, as a game viewed through a web browser on the client systems 308, 310, 312). As a further example, the electronic game may be provided as a downloadable software application (commonly referred to as an "app") for execution on specific software platforms such as the Microsoft Windows® operating system, Apple iOS operating system, or the Google Android operating system.

The network 314 can include or, in various examples, operate in series or parallel with a social network. A social network is a network-addressable computing system that can host one or more social graphs. The social network can generate, store, receive, and transmit social networking data. Some or all of the electronic games implemented by the game servers 302, 304, 306 can be provided to the client systems 308, 310, 312 via the social network.

The system 300 can further include an aggregator server 316 operating an aggregator database 318 and a cross-promotion engine 320. The aggregator database 318 can include information transmitted from the game servers 302, 304, 306. The aggregator database 318 can store the information on various electronic storage media, including non-volatile storage, such as hard disks and flash memory, or in volatile memory, such as random access memory (RAM). The information in the aggregator database 318 can be utilized by the cross-promotion engine 320, in conjunction with rules provided to the cross-promotion engine 320, to establish promotions between and among the various electronic games implemented on the game servers 302, 304, 306.

The cross-promotion engine 320 can include hardware, such as one or more processors 322 and electronic memory 324 for storage of the cross-promotion rules. The hardware of the cross-promotion engine 320 can be shared with the aggregator database. For instance, the processor 322 can provide processing capability for the aggregator database 318 and the storage of the aggregator database 318 can provide memory assets for the cross-promotion engine 320. As will be discussed in detail below, the cross-promotion engine 320 can implement one or more application program interfaces (API) to provide cross-promotion between and among the electronic games implemented on the game servers 302, 304, 306. Additionally, the system 300 as a whole can provide such cross-promotions in "real-time," where information can be transmitted from the game servers 302, 304, 306 to the aggregator database 318 based on the receipt of the information in the servers 302, 304, 306, and the cross-promotion engine 320 can be configured to create new cross-promotions between and among the electronic games upon the relevant information being stored in the aggregator database 318.

The components of the system 300 can be communicatively connected with respect to one another other using any of a variety of suitable connections. For example, suitable connections can include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, some of the components of the system 300 can be communicatively coupled via an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections.

Cross Promotion

Various techniques are described herein for providing cross-promotional game functionality and features specific to electronic games. These features can include a variety of techniques for connectivity between electronic games, which may include the same version of games, related games, or non-related games. Certain features can include: incentivized techniques for cross-promotion between electronic games based on activities occurring in either of the electronic games; providing gaming rewards in one electronic game in connection with game play occurring one or more other electronic games; and sending game information such as characteristics, rewards, and in-game messaging between the game servers 302, 304, 306 and the aggregator database 318.

The system 300 can provide automated cross promotions between the electronic games and based on the information stored in the aggregator database 318 and the cross-promotion engine 320. Cross-promotion engine 320 can register assets utilized in an electronic game, such as virtual goods and virtual items, to a user based on conduct in another virtual game. Rules can be registered within the cross-promotion engine that can be attached to rewarded virtual goods. Users of the virtual games who receive cross-promotional offers from the cross-promotion engine 320 can, in various examples, choose among cross promotion goods and events, and the cross-promotion engine 320 can track the users' progress and cross-promotional rewards. For example, if a user completes a cross-promotion, the user can be notified and credited the reward when they next enter the electronic game in which the user accepted the promotion. The cross-promotion can be applied between mobile and non-mobile versions of an electronic game.

System

Figure 4:
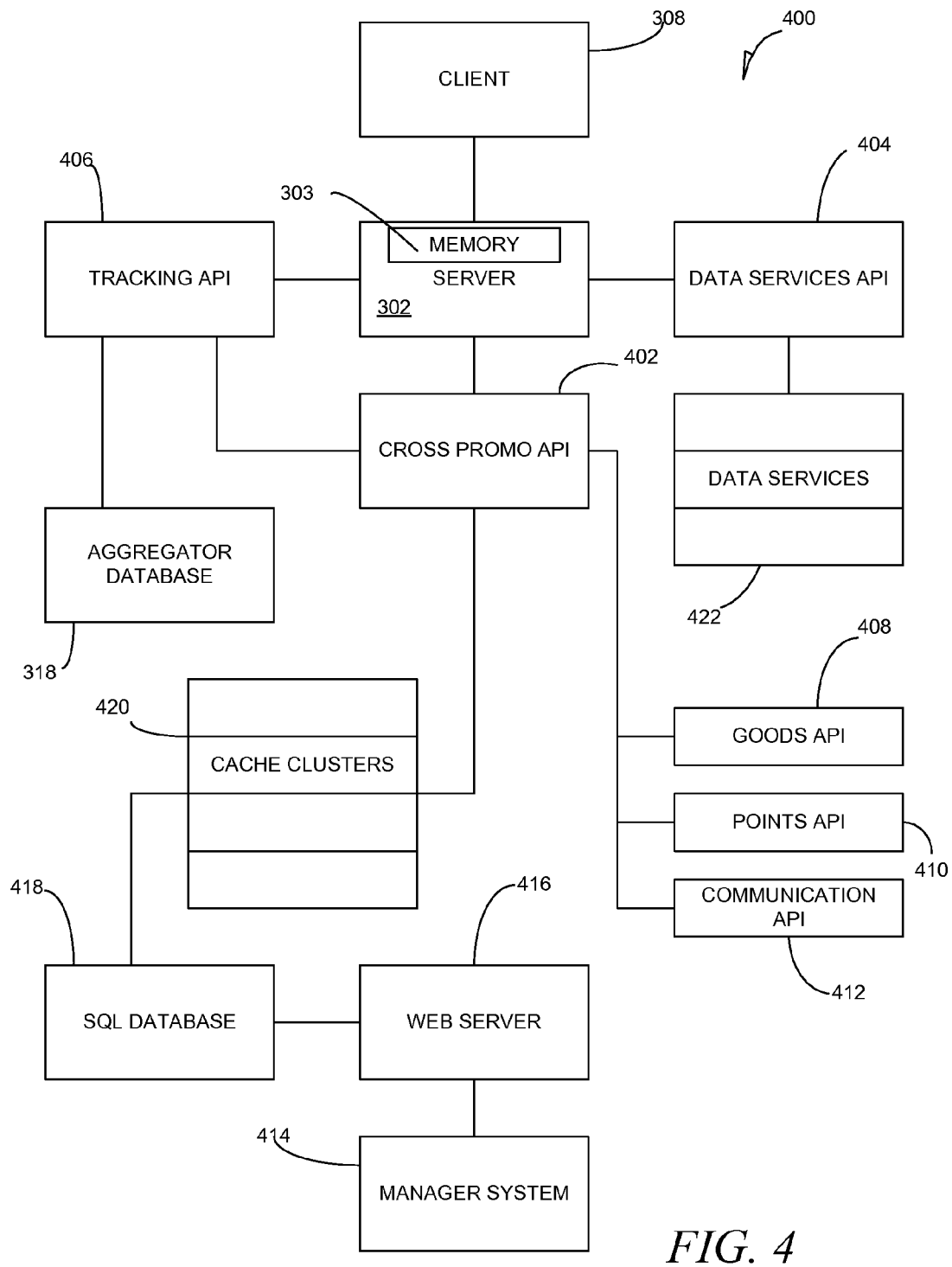
FIG. 4 is a block diagram of a system for providing automated cross-promotion.

FIG. 4 is a block diagram of a system 400 for providing automated cross-promotion. The system 400 can be a detailed example of a portion of the system 300. While the system 400 illustrates, for instance, only one game server 302, it is to be understood that the system 400 is scalable to multiple game servers 304, 306 of the system 300, among other components.

The game server 302 is communicatively coupled to the client system 308 as well as to a cross-promotion API 402, a data services API 404 and a tracking API 406. The game server 302 can include or be communicatively coupled to a distributed cache, such as can be provided by a Memcache, and a key-value database, such as can be provided by membase, for storing and manipulating cross-promotional objects and metadata. The game server 302 can further include or be communicatively coupled to a payment server for managing and receiving user fees related to the electronic game implemented on the game server 302.

The cross-promotion API 402 can be implemented as part of the cross-promotion engine 320. The data services API 404 and the tracking API 406 can also be components of the cross-promotion engine 320. The tracking API 406 can be part of the aggregator database 318, specifically, or the aggregator server 316, generally. The data services API 404 can be a component of the game server 302 or the aggregator server 316, generally.

The cross-promotion engine 320 can further include dedicated APIs 408, 410, 412 for making cross-promotion awards as determined by the cross-promotion API 402 and as detailed below. In an example, a goods API 408 can be communicatively coupled to the game servers 302, 304, 306 and/or to the tracking API 406 and can command the granting of virtual goods within particular electronic games based on an output from the cross-promotion API 402. A points API 410 can similarly be communicatively coupled to the game servers 302, 304, 306 or to the tracking API 406 and can make meta-rewards which can be applicable across more than one of the electronic games, such as proprietary points which can be applied to various electronic games for access to the games or various benefits within the electronic games. A communication API 412 can transmit cross-promotion offers to players of the electronic games. Additional dedicate APIs can be included, such as an API to register achievements within various electronic games.

Tracking API

The tracking API 406 can manage the collection of game data from the game databases stored on the memory devices 303, 305, 307 of the game servers 302, 304, 306. The tracking API 406 can manage the transfer of data from components of the system 400, such as the game servers 302, 304, 306 and the cross-promotion API 402, to the aggregator database 318. In an example, the tracking API 406 can also manage the transfer of data from the aggregator database 318 to other components in the system 400, including the game servers 302, 304, 306.

The tracking API 406 can track the data stored in the game servers 302, 304, 306 and as utilized by the cross-promotion API 402 according to various rules and criteria. The tracking API 406 can track user actions within individual electronic games by requesting or monitoring for information related to user actions. For instance, the tracking API 406 can request data relating to an amount of time a user has played an electronic game, a level of achievement within an electronic game, virtual items or goods obtained by the user within an electronic game, and so forth. Such data can, in certain examples, be identified based on a file format of the data or based on metadata relating to the data. In such examples, the tracking API 406 can obtain such data by directing the transfer of particular file types to the aggregator database 318. The tracking API 406 can periodically request such data or can establish a standing rule that such data automatically be transmitted by, for instance, the game servers 302, 304, 306 or the cross-promotion API 402 upon the data being generated. The tracking API 406 can establish an effectively real-time tracking and transfer of game data from various electronic games and can provide greater uniformity in tracking user activity than might be provided by individual and separate analysis of game databases 303, 305, 307.

The tacking API 406 can incorporate various functions to provide consistent tacking of game data and related user attributes for the various electronic games implemented on the servers 302, 304, 306. In an example, the tracking API 406 can have a setVisit function to record individual visits or uses of a particular electronic game by a user. Alternatively, the setVisit function can be cumulative over all of the electronic games being tracked. In an example, the tracking API 406 can have functions relating to tracking interactions with social network friends and neighbors of a user of an electronic game. In an example, the tracking API 406 can have a storeNeighborList function, an updateNeighborList function, a storeFriendList function and a updateFriendList function to track social network friends and neighbors. Such functions can be related to a specific electronic game, to a multiple electronic games, and to a specific user.

The tracking API 406 can incorporate a setAchievement function and an updateAchievement function to track user achievements and user attributes within electronic games. The setAchievement and updateAchievement functions can also be utilized to update user achievements and attributes upon the user being granted and accepting a cross-promotional award; upon acceptance of the cross-promotional award, the tracking API 406 can update the aggregator database 318 using the updateAchievement function provisioned with the particular award.

Cross-Promotion API

The cross-promotion API 402 can incorporate a variety of functions, detailed below, for providing automated cross-promotion between and among electronic games. The cross-promotion API 402 can be implemented on or by the processor 322 of the cross-promotion engine 320. In an example, the cross-promotion API 402 can be implemented on dedicated off-the-shelf or custom designed hardware. The processor 322 or dedicated hardware can implement cross-promotion of electronic games by implementing the functions detailed below.

The cross-promotion API 402 can utilize a variety of rules for the conducting promotions between electronic games. Meeting a rule can be a basis for granting or offering a cross-promotion to an electronic game. As will be discussed below, a manager of the system 400 can select rules and specific criteria for meeting the selected rules. The manager can also specify specific outcomes for meeting specific criteria, or can establish general cross-promotional outcomes or offers when rules are met. The rules can provide cross-promotional offers, evaluate user achievement fulfillment, issue game rewards, and track user actions.

A first example rule can relate to a user reaching a pre-set value for a user attribute, such as a level of attainment within the game, the collection of a certain amount of virtual items within the game, and so forth. A level of attainment within the game can be increased as various goals are achieved within the game.

A second example rule can relate to an extent that a specific metric is increased. Such specific metrics can include an amount of time the user has played an electronic game, and amount of time a user has been registered to play a game, along with any other measurable metric within an electronic game.

A third example rule can relate to a daily active user (DAU) driven metric. A DAU metric can pertain to the occurrence, frequency, or reliability with which a user plays an electronic game. For instance, a player who plays an electronic game, or who plays the electronic game a certain number of days in a row, or a certain number of days out of a predetermined total number of days may meet the DAU metric.

A fourth example rule can relate to achieving accumulative goals across multiple electronic games. Such a rule can operate as being cumulative of some or all of the preceding rules. In such an example, a user may have a DAU metric in a first electronic game, such as is provided by the game server 302, as well as a DAU metric in a second electronic game, such as is provided by the game server 304. Upon the combined DAU metric for each electronic game totaling at least the accumulative goal, the fourth rule can generate a cross-promotion related to, for instance, a third electronic game provided by the game server 306.

A fifth example rule can relate to reaching a goal in one, some or all of a predetermined group of electronic games. For instance, the rule can require reaching a pre-set value for a user attribute in any one electronic game of a list of electronic games, such as all electronic games provided by a certain provider. Alternatively, the rule can require reaching a pre-set value for a user attribute in a predetermined number of a list of electronic games. The predetermined number of electronic games can be some or all of the list of electronic games.

A sixth example rule can relate to achieving a goal within a given time constraint. A user may be required to improve a user attribute within an electronic game a predetermined amount within a predetermined period of time to receive a cross-promotional offer. A user may be required to play an electronic game a certain amount of time over a predetermined period of time to receive a cross-promotional offer.

Such example rules can be utilized by a manger system 414 of the system 400 to create specific rules for particular circumstances. The manager system 414 can be communicatively coupled to the cross-promotion API 402 by way of a web server 416, a data management database 418, and various cache clusters 420. The manager system 414 can interact with the cross-promotion API 402 by way of a web interface, such as a web browser. The data management database 418 can be implemented according to a data management language, such as the Structured Query Language (SQL). The cache clusters 420 can cache files according to file type, with each cluster configured to cache a different file type, such as EC2 files, SV2 files, SV4 files, and so forth. The cache clusters 420 can be distributed cache clusters 420. The distributed cache clusters 420 can use memcached distributed memory caching.

Subordinate API

In various examples, the cross-promotion API 402 can include subordinate APIs for performing certain functions. In certain examples, the functions of the subordinate APIs can be incorporated as functions of the cross-promotion API 402. In an example, the cross-promotion API 402 can include a subordinate CrossPromoUser API to capture a state, progress, and actions performed by a user with respect to a particular cross promotional offer. In an example, the cross-promotion API 402 can include a CrossPromoGoodItem API to check a status on reward items. Such reward items can have been rewarded to one or more users as a result of previously cross-promotional offers. In an example, the cross-promotion API 402 can include a CrossPromoGame API that can store cross-promotional metadata from the cross-promotional API 402 or a cross-promotional manager class.

In an example, the cross-promotion API 402 can include a subordinate CrossPromo API configured to access cross-promotional metadata from a variety of electronic games as well as the progress of users who have been offered cross-promotions regarding achieving the offered cross-promotions. The CrossPromo API can incorporate a unique cross-promotional API for each cross promotion, while various users can be identified according to various criteria. In an example, a particular cross promotion can be identified according to a social network identification, a user unique identification, a cross promotion identification number, or some combination thereof.

In an example, the CrossPromo API can include a getCrossPromos function. The getCrossPromos function can return a sorted list of cross-promotional offers that has a particular electronic game as the game that sent the offers to the users. The returned list can be filtered according to various criteria. For instance, the getCrossPromos function can remove offers in which an identification of the sending electronic game of the offer, an identification of the client, and a version of the sending electronic game do not match a particular player's game, client, and version. The getCrossPromos function can remove electronic games that have not yet been offered or the operation of which has been terminated. The getCrossPromos function can remove electronic games in which an offer type identification of an install offer or an upgrade offer (see above) is not an improvement over what the user already possesses or, in the case of the upgrade offer, if the user does not already possess the base electronic game. The getCrossPromos function can sort the presented list according to various criteria, including displaying offers accepted before offers that haven't been accepted; displaying higher priority offers before lower priority offers; displaying offers that have not been viewed before offers that have been viewed; displaying offers that have been viewed more before offers that have been viewed less; and displaying offers that have a later start date before offers with earlier start dates.

In an example, the CrossPromo API can include a checkAcceptedCrossPromos function that can check whether a particular use has accepted various cross-promotional offers. The offers can be checked according to offer type, and can be checked according to the electronic game from which the offer was sent and the electronic game for which the offer grants the reward. The function can also cross-reference install and upgrade offers to verify that different offers originating from different electronic games do not duplicate the electronic game for which the install or upgrade offer is made.

In an example, the CrossPromo API can include a rewardCrossPromo function to issue a reward for accepting and/or meeting the terms of a cross-promotion. In an example, the CrossPromo API can include a registerReward function to register a number of rewards by electronic game. The electronic games by which rewards are registered can be originating games or the games in which the cross-promotional reward is offered. In an example, the CrossPromo API can include an acceptedCrossPromo function return cross-promotional offers that have been accepted by a user. In an example, the CrossPromo API can include a viewedAndAccepted function to return a log of offers that a user has viewed and accepted. In an example, the CrossPromo API can include a viewedCrossPromo function to return a log of offers that a user has viewed.

In an example, the CrossPromo API can include a removeCrossPromo to delete particular offers. The removeCrossPromo function can be triggered upon a time or event-driven termination of the offer. In an example, the CrossPromo API can include a declinedCrossPromo function to allow a user to opt out of an offer. In an example, the CrossPromo API can include an undeclinedCrossPromo function to all a user to choose an offer that the user had previously declined. In an example, the CrossPromo API can include a hasInstall function to determine if a user has installed a particular electronic game.

Data Services API

The data services API 404 can operate as part of, or in conjunction with the aggregator server 316, generally, and the aggregator database 318, specifically. The data services API 404 can provide the system 400 with real-time access to aggregated user attributes. In an example, the data services API 404 can provide aggregated user attributes for all users of some or all of the electronic games in the system 300 or 400. The aggregated user attributes can be collected at predetermined intervals, such as daily. The user attributes can include metrics calculated on the basis of the user attributes.

In an example, the data services API 404 can include a social graph platform. The social graph platform can include information relating to users' interactions with a social network. Such interactions can include interactions between and among social network friends and neighbors within the electronic games.

In an example, the data services API 404 can include or be communicatively coupled to a real-time read/write cache service. The real-time cache service can utilize data services cache clusters 422. The data services cache clusters 422 can be included as components of the aggregator server 316 or can be distributed cache clusters in a variety of physical locations. The data services cache clusters 422 can store user attribute information according to various criteria, including data type and file type.

The data services API 404 can utilize both the data services cache clusters 422 as well as cache resident on game servers 302, 304, 306. In particular, the data services API 404 can monitor the cache of the game servers 302, 304, 306 for relevant user attribute data or relevant file types and direct that the relevant data be transmitted to an appropriate data services cache cluster 422. The data service API 404 can further or alternatively provide the game servers 302, 304, 306 with rules to establish circumstances under which data is transferred from the game servers 302, 304, 306 to the data services cache clusters 422. The data services API 404 can also operate to cache user attributes for electronic games which are implemented on game servers 302, 304, 306 that do not incorporate resident cache. In such an example, the data services API 404 can direct all caching on such games to the data services cache clusters 422.

The data services API 404 can include a variety of functions for obtaining and segmenting or ranking user attributes. The user attributes can be related to an individual electronic game or can apply across multiple electronic games. In an example, the data services API 404 can utilize data stored in the data services cache clusters 422 and in the aggregator database 318 and the system 400 generally. In an example, the data services API 404 can utilize only data stored in the data services cache clusters 422.

In an example, the data services API 404 can include a dataService function to retrieve an object from a game cache on a game server 302, 304, 306. In an example, the data services API 404 can include a getUser function to retrieve a single specified user from a game cache. In an example, the data services API 404 can include a getMultiUser function to retrieve multiple specified users from a game cache. The getMultiUser function can specify user retrieval according to a user identification number, according to a user name, or according to an email address, among other criteria.

In an example, the data services API 404 can include a getUserAtriribute function to obtain a single user attribute according to an index of all user attributes. The getUserAttribute function can operate by index or by user identification. In an example, the data services API 404 can include a getKeyValue function to get an associative array of user attributes, either of a single electronic game or multiple electronic games. The getKeyValue function can obtain the array of user attributes from information returned by the getUser or getMultiUser function. The getKeyValue function can be based on an index or on a user identification. In an example, the data services API 404 can include a getGameList function to return a list of games played by a user. The getGameList function can operate based on an index or a user identification.

In an example, the data services API 404 can include a getUserID function to obtain a user identification. The getUserID function can operate based on an index or an email address. In an example, the data services API 404 can include a getSocialGameNetworkID function to obtain an identification of a social network utilized in or by an electronic game. In an example, the data services API 404 can include a getFriendbyGame function to filter users of a user list based on a game list of social network friends or neighbors of the various users. In an example, the data services API 404 can include a getFriendAtrributebyGame function to obtain a user attribute of social network friends of users of an electronic game. In an example, the data services API 404 can include a getFriendMultiAtributebyGame function to obtain multiple user attributes of social network friends of users of an electronic game. In an example, the data services API 404 can include a getFriendMultiaAttributeforGames to obtain multiple user attributes of social network friends of users of multiple electronic games. The number of users, friends, and games for which the function can return data can be limited.

In an example, the data services API 404 can include a getOptimalInviteRecipientList function to filter out users who are already social network friends or neighbors of a user whose friends or neighbors have already been obtained. In an example, the data services API 404 can include a getFriendList to obtain a list of friends or neighbors of a user of a social network and an electronic game. In an example, the data services API 404 can include an updateFriendList function to add or remove friends or neighbors from a user friend list as obtained, for instance, by the getFriendList function.

The data services API 404 can include functions directed toward providing real-time read/write caching of user attributes and, in various examples, other game data. As discussed above, in various examples, the functions for transferring data in real-time can be transmitted to a game cache and utilized by the game cache as an ongoing rule to transmit relevant user attributes upon the user attributes being stored in the game cache. To achieve real-time read/write caching, then, the deciding factor for transmittal of data can be receipt of the data in the game cache rather than, for instance, periodic transmittals of data based on elapsed time. The user attributes transmitted in real-time can be dynamically updated in real-time by the electronic game. An electronic game user object key for, for instance, a user attribute can be comprised of identifying information. In an example, the game user object key can be comprised of a social network identification, a user identification, a game identification, and a client identification.

In an example, the data services API 404 can include a storeGameObject function to store a game user object. The game user object can be stored in the data services cache cluster 422 and/or in a stats membase. In an example, the data services API 404 can include a storeGameObjectWithCookie function to store the user object in the data services cache cluster 422 and return a browser client "cookie," as known in the art. In an example, the data services API 404 can include a getGameObjectWithCookie function to get a game object if the electronic game chooses to use a client cookie to cache the game object. In an example, the data services API 404 can include a setLevel function to set a cross-promotional level within a game. The cross-promotional level can be used to trigger a cross-promotion upon the user reaching the level within the game. In an example, the data services API 404 can include a getLevel function to get the user cross-promotional level.

In an example, the data services API 404 can include a setVisit function to set information relating to a use, or "visit," of an electronic game by a user. The information can include, for instance, a date stamp and a version of the electronic game. In an example, the data services API 404 can include a getVisit function to return an associative array with information including a client identification, a version of an electronic game, a visit date stamp, and a visit bitmap. In an example, the data services API 404 can include a setInstall function to set a date stamp for an installation of an electronic game or a version of an electronic game. In an example, the data services API 404 can include a getInstall function that can return an associative array with information that can include a client identification, a version of the electronic game, and a date stamp. In an example, the data services API 404 can include a setAchievement function to set an achievement which may be met or provided as part of a cross-promotion. In an example, the data services API 404 can include a getAchievement function that can return an associative array with information that can include, for instance, an achievement identification and an achievement count. In an example, the data services API 404 can include an updateAchievement function that can update an achievement counter based upon achievements being or having been achieved.

General Functions

In various examples, one or more element of the system 400 can include functions for obtaining one or more identification constants. The elements of the system 400 that can include such functions include, but are not necessarily limited to, the cross-promotion API 402, the data services API 404, and the tracking API 406. In an example, the system 400 can include a getNetwork function that can return an associative array with information that can include, for instance, a social network name and a social network identification. In an example, the system 400 can include a getClient function that can return an associative array with information that can include, for instance, a client name and a client identification. In an example, the system 400 can include a getGame function that can return an associative array with information that can include, for instance, a game name and a game identification.

In an example, the system 400 can include a createGameID function that can create a game identification for new electronic games. In an example, the system 400 can include a updateGame function that can update information relating to an electronic game, including, but not necessarily limited to, a game name and a state of the game. In an example, the system 400 can include a getGameValues function that can return an associative array that can include, for instance, an identification, name, type, and state of an electronic game.

Manager System

Figure 5:
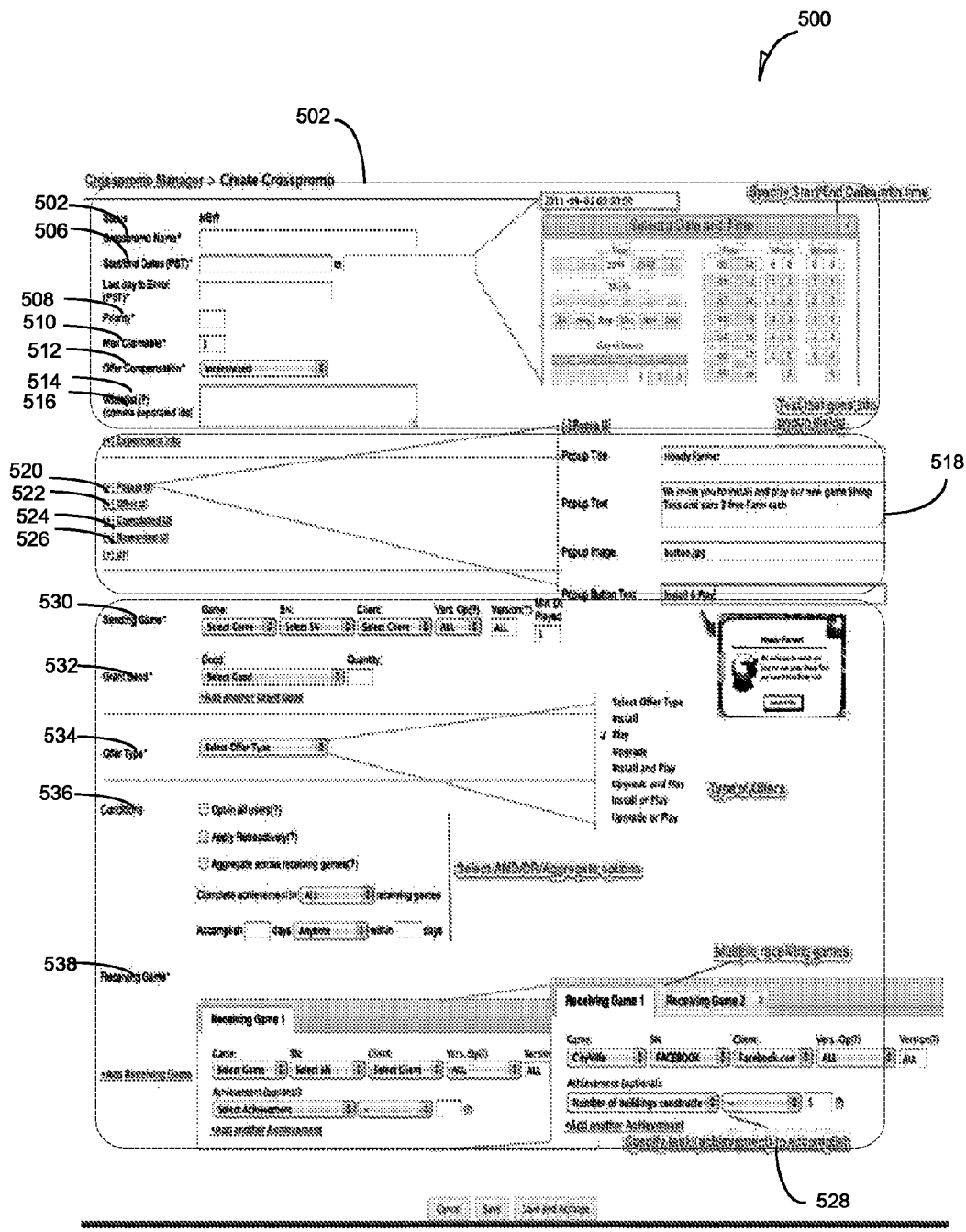
FIG. 5 is a screen shot of a web-based user interface for creating cross-promotional offers.

FIG. 5 is a screen shot of a web-based user interface 500 for creating cross-promotional offers. The web-based user interface 500 can be provided on the manager system 414. The manager system 414 can incorporate non-web-based user interfaces for creating cross-promotional offers. Such non-web-based user interfaces can include the same or similar input fields as are shown in the web-based user interface 500.

Status fields 502 can include fields for: entry of a name 504 of a cross-promotion; a date range 506 for a cross-promotion, including a last date to enroll; a priority 508 of the cross-promotion; a maximum number of times 510 the cross-promotion can be claimed by any given user; whether or not the offer is presented with an incentive 512; a list 514 or "whitelist" of conditions or users that can be exempted from filter conditions; and experimental information 516. Message fields 518 can be utilized for specifying a message to be displayed on a client system 308. The messages can include text and images. Messages can convey: a cross-promotional offer 520, including a selection for whether an offer is in the form of a popup window; that a cross-promotional offer has been completed 522; that a reward has been awarded 524; and a uniform resource locator (URL) 526 that a user can click to view a webpage.

Cross-promotional fields 528 can provide for specifying the terms of a particular cross-promotional offer or general rules for creating future cross-promotional offers. The cross-promotional fields 528 can specify: a sending game 530 to identify from which electronic game a cross-promotional offer can originate; a good to be granted or awarded 532 in the offer; an offer type 534, as discussed below; a condition 536 for how, when, and on which games the offer is provided; and one or more receiving games 538 for the offer.

In an example, the manger system 414 can utilize the web-based user interface 500 to create a rule to offer a promotion in a first electronic game when a user installs a second electronic game on a client system 308, or when the user installs multiple additional electronic games on the client system 308, or installs a certain number of electronic games from a list of electronic games. In an example, the manager system 414 can create a rule to provide a DAU-based cross-promotional award for a first electronic game when a user visits or uses a second electronic game, or for playing a certain number of electronic games within a predetermined period of time, or for playing a certain electronic game a certain number of days in a row. In an example, the manager system 414 can create a rule to reward achieving a user attribute, such as offering a cross-promotional reward for the user reaching a predetermined level in an electronic game, reaching a predetermined level in a predetermined number of electronic games, or upon regular, predetermined advances, such as every five levels attained, either within one electronic game or across multiple electronic games.

In an example, the manager system 414 can create rules to encourage a user to interact with other members of a social network. In an example, rules can provide for cross-promotional rewards for a user having a certain number of social network friends or neighbors play an electronic game, or for having a certain number of social network friends or neighbors start or continue playing one or more electronic games, or for having a social network friend or neighbor who plays an electronic game a certain number of times or a certain amount of time during a predetermined time period. In an example, the manager system 414 can create rules for rewarding interaction within a social network, such as by rewarding a user who helps a certain number of users in an electronic game in a predetermined period of time (e.g., one day), or by rewarding a user who accepts a certain number of gifts in one or more electronic games, such as in a predetermined period of time.

In an example, the manger system 414 can create rules for rewarding specific events within one or more electronic games, such as achieving a goal (e.g., harvesting a predetermined amount of agricultural product in a farm simulation) or contributing to a common effort (e.g., constructing a building in a city simulation).

The cross-promotion API 402 can incorporate a variety of functions. In an example, the cross-promotion API 402 can include a getCrossPromos function to generate a cross-promotion based on the rules provided to the cross-promotion API 402, such as by the manager system 414. In an example, the cross-promotion API 402 can include a acceptedCrossPromo function to indicate a user has accepted an offered cross promotion, whereupon the aggregator can be updated by the tracking API 406. In an example, the cross-promotion API 402 can include a checkAcceptedCrossPromos function to identify which cross-promotional offers have been accepted by the user. In an example, the cross-promotion API 402 can include a viewedCrossPromo function to identify which cross-promotional offers have been viewed by the user. In an example, the viewedCrossPromo function can return cross-promotional offers which have been viewed but not accepted by the user. In an example, the cross-promotion API 402 can include a declinedCrossPromo function to identify which cross-promotional offers have been declined by the user. In an example, the cross-promotion API 402 can include a undeclinedCrossPromo function to identify which cross-promotional offers have not been accepted or declined by the user. In an example, the cross-promotion API 402 can include a removeCrossPromo function to remove a user's cross promotional data and withdraw an offered cross-promotion.

The cross-promotion engine 320 generally can incorporate a variety of classes, and in an example the cross-promotion API 402 incorporates some or all of the classes of the cross-promotion engine 320. The classes can predefine constants and lists. The cross-promotion engine 320 can include a utility class for logging data, formatting data, such as dates, and handling metadata retrieval and parsing. The cross-promotion engine 320 can include a promotion class which can include several classes, including an abstract class and a base class to provide for the locking of records when data is being manipulated and written back to the records. The cross-promotion engine 320 can include a writing and sync logic class representing data and filtering cross-promotional offers, as discussed in detail below. The cross-promotion engine 320 can include one or more classes for preventing duplication of cross-promotional offers, as discussed in detail below. The cross-promotion engine 320 can include a class for saving a start-state metric of a user.

Cross-Promotional Offers

The cross-promotion API 402 can generate cross-promotional offers. Such cross-promotional offers can be made to users to promote a first electronic game, such as an electronic game which a user has not played or is only infrequently playing, while granting a benefit to a user in a second electronic game, such as an electronic game that the user is actively playing. The cross-promotion API 420 can promote more than one electronic game in a single promotion and can grant a benefit in more than one electronic game in a single promotion.

In an example, the cross-promotion API 402 can offer to install an electronic game on a client system 308. Such an offer, as well as other offers below, can grant to a user a benefit in one or more other electronic games upon completion. In an example, the cross-promotion API 402 can grant a reward to a user in a second electronic game for playing a first electronic game a predetermined period of time. In such an example, the user already has the first electronic game on the client system 308. In an example, the cross-promotion API 402 promotes an upgraded version of an electronic game that is already loaded on the client system 308.

In various examples, the cross-promotion API 402 can base a promotion on combinations of the above cross-promotions. In an example, the cross-promotion API 402 can offer a reward for installing an electronic game and for playing the electronic game a predetermined amount of time. In an example, the cross-promotion API 402 can offer a reward for upgrading an electronic game and playing the electronic game a predetermined amount of time. In an example, the cross-promotion API 402 can offer a reward for installing, upgrading, or playing an electronic game.

Users can be filtered from cross-promotional offers. Users who might otherwise meet criteria for receiving a cross-promotional offer can be prevented from receiving the offer. In an example, a user can be excluded from an otherwise qualifying offer in order to experiment with an offer to gauge user reaction. For instance, it can be useful for experimental purposes to determine if a user who would otherwise have been granted an offer including a reward would do what was offered of the user's own volition without the need to have offered a reward. In an additional example, a user can be required to meet certain minimal preconditions to receive an offer. Such preconditions can include a requirement to have installed an electronic game for at least a predetermined period of time or to have played an electronic game within a required amount of time. In an example, players who have already received a particular cross-promotional offer may be inhibited from receiving the same offer again.

Filtering cross-promotions can extend to filtering or otherwise inhibiting cross-promotions based on previously accepted cross-promotions. The manger system 414 can be utilized to prevent a cross-promotion being sent again to a user who has already rejected the cross-promotion. The manager system 414 may specify that a user who has already received or accepted a first cross-promotion may be inhibited from receiving a second cross-promotion. In such an example, the manager system 414 may specify that a user who has received the second cross-promotion is not inhibited from receiving the first cross promotion. In an example, the manger system 414 can specify that a user will not receive a second cross-promotion until a first cross-promotion has been accepted or completed. In an example, some or all filters can be waived for one or more users to whom the filter would otherwise apply.

Flowcharts

Figure 6:
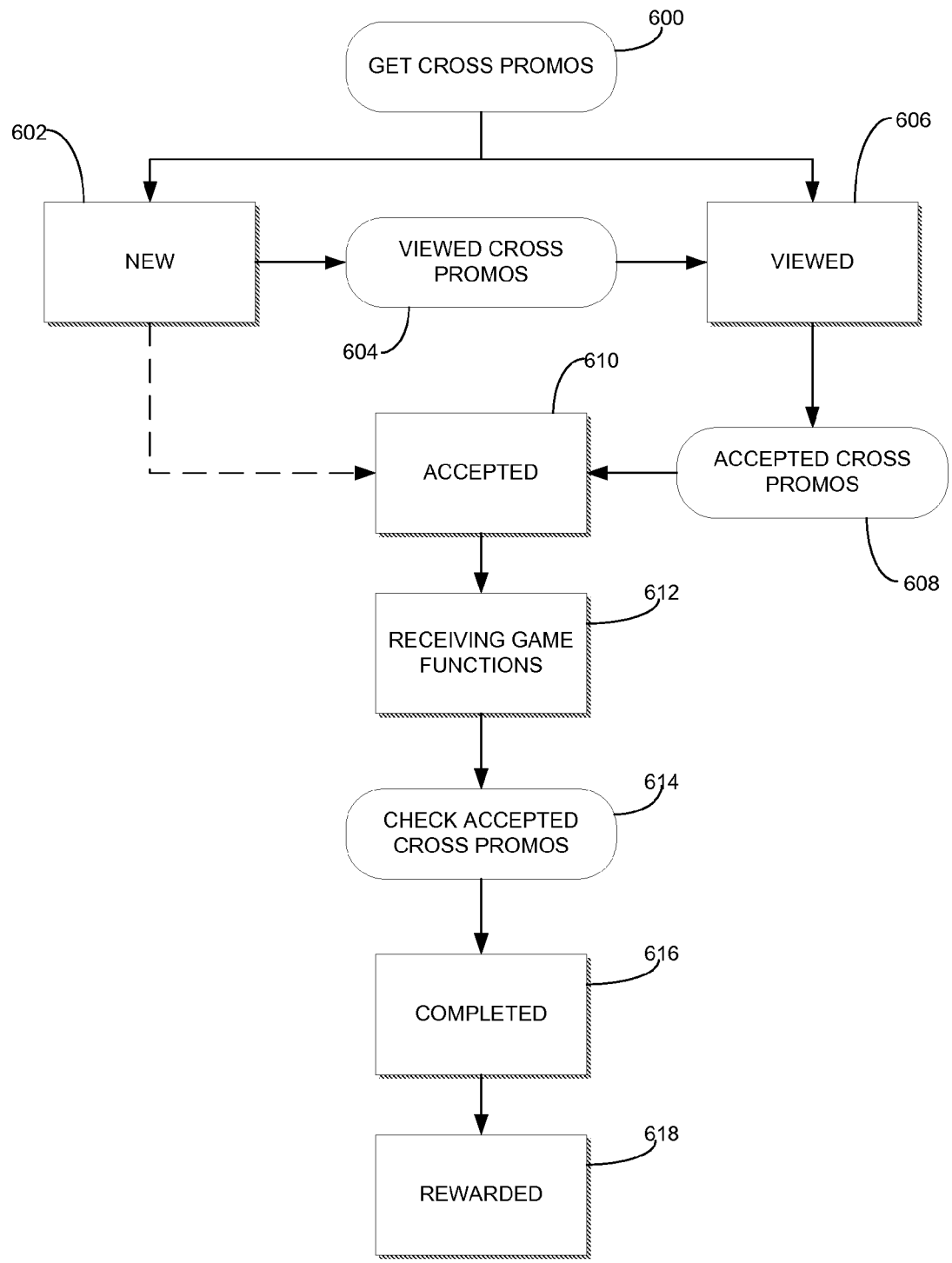
FIG. 6 is a flowchart showing an exemplary use of various cross-promotional functions.

FIG. 6 is a flowchart showing an exemplary use of various cross-promotional functions as detailed above. The flowchart can be implemented on the systems 300, 400 detailed above, or can be implemented on other systems and hardware that is suitable to implement the functions and steps below. The flowchart can be utilized by, for instance, a system administrator to obtain information relating to the status of existing cross-promotions and to implement or modify cross-promotions. In various examples, functions as mentioned below and discussed above can be implemented as APIs or other software or hardware implementations as known in the art.

At block 600, a function to get cross-promotions that have been offered to users can be called. In an example, the getCrossPromos function can be utilized as discussed in detail above. A returned list of cross-promotions can be assessed or filtered for various conditions, such as if the cross-promotions are new or have been previously viewed by users.

At block 602, the cross-promotions can be identified as new and can be utilized for various purposes. The new cross-promotions can be stored for future reference. Alternatively, the new cross-promotions can be utilized in the near term. For instance, the new cross-promotions can be displayed to a user, such as on the web-based user interface 500. The new cross-promotions can be provided to an analyzer for statistical analysis, such as can be included in the systems 300, 400. The cross-promotion engine 320 can be updated based on a user or analyzer analysis.

At block 604, a function to obtain cross-promotions that were viewed by a user can be called. In an example, the viewedCrossPromo function can be called.

At block 606, a list of viewed cross-promotions can be utilized or manipulated. The viewed cross-promotions can have been obtained from various functions to obtain a list of cross-promotions that have been viewed by users, including those functions called at blocks 600 and 602. The list of viewed cross-promotions can be stored, presented to a user, and/or provided to an analyzer for analysis.

At block 608, a function to obtain accepted cross-promotions can be called. In an example, the acceptedCrossPromo function can be called.

At block 610, a list of cross-promotions that have been accepted by a user can be utilized or manipulated. The accepted cross-promotions can have been obtained from various functions to obtain a list of cross-promotions that have been accepted by users, including those functions called at blocks 600 and 608. The list of accepted cross-promotions can be stored, presented to a user, and/or provided to an analyzer for analysis.

At block 612, a user can be directed to an interface for an electronic game that is the subject of one or more of the cross-promotions. For instance, a user can call functions such as setAchievement, setInstall, setVisit, setLevel, and so forth, as described in detail above. The functions as called by the user can obtain information about cross-promotions that have been accepted, the benefits that have been granted to users through the cross-promotions, and changes to existing or future cross-promotional offers. For instance, future cross-promotional offers for a particular electronic game can be switched from offering complimentary playing time to offering a good or item within the game.

At block 614, a user can return to manipulating or analyze an electronic game in which an offer for the receiving game is generated by checking whether a particular user. For instance, a user who has accepted a cross-promotional offer for the receiving game in block 612, has accepted other cross-promotional offers, for the receiving game or otherwise. For instance, checkAcceptedCrossPromos function can be called to obtain such information.

At block 616, the cross-promotions that were identified as completed by a user at block 614 can be utilized for various purposes. The completed cross-promotions can be stored for future reference. Alternatively, the completed cross-promotions can be utilized in the near term. For instance, the completed cross-promotions can be displayed to a user, such as on the web-based user interface 500. The completed cross-promotions can be provided to an analyzer for statistical analysis, such as can be included in the systems 300, 400. The cross-promotion engine 320 can be updated based on a user or analyzer analysis.

At block 618, the cross-promotions that were identified as rewarded by a user at block 614 can be utilized for various purposes. The rewarded cross-promotions can be stored for future reference. Alternatively, the rewarded cross-promotions can be utilized by a user or analyzer, such as by cross-referencing the rewarded cross-promotions against the completed cross-promotions analyzed at block 616 to identify any discrepancies.

Figure 7:
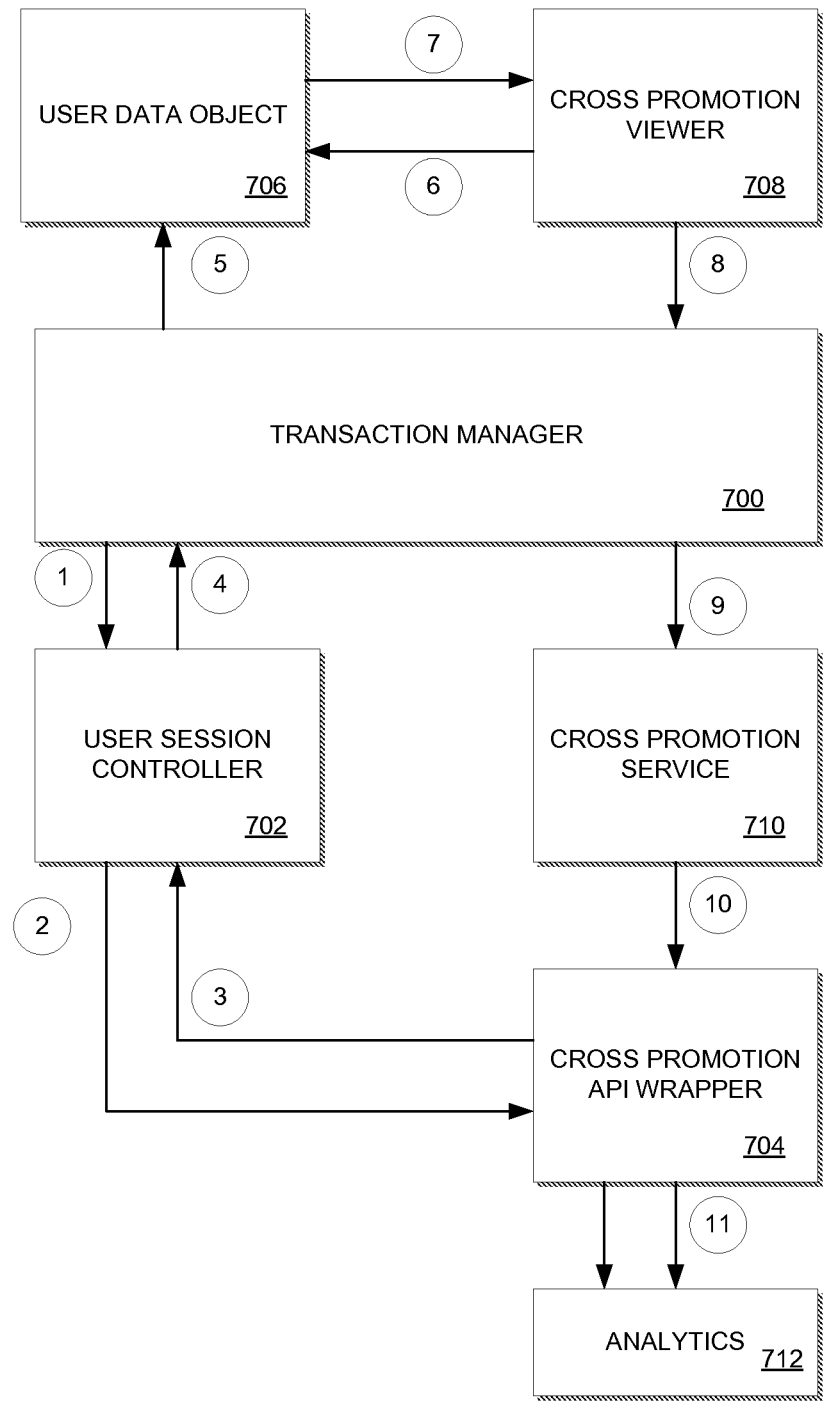
FIG. 7 is a data flow chart showing cross-promotional data flow.

FIG. 7 is a data flow chart showing cross-promotional data flow. The flowchart can be implemented on the systems 300, 400 detailed above, or can be implemented on other systems and hardware that are suitable to implement the functions and steps below. The data flow can be utilized to generate, display, and record the results of cross-promotions.

At process flow (1), a transaction manager 700 operating at a game client, such as the client system 308, can transmit user data to a user session controller 702 operating on a game server, such as the server 302. The user session controller 702 can manage the flow of data between the game client and the other components of the game server. The user data can include, for instance, information about user age and gender that can be utilized by the cross-promotion engine 320 in the generation of cross-promotions.

At process flow (2), the user session controller 702 can make function calls to a cross-promotion API wrapper 704, which can be a component or all of the cross-promotion API 402. The cross-promotion API wrapper 704 can execute particular information management and control, such as by encrypting, stripping, or otherwise concealing various data related to a cross-promotion. For instance, the cross-promotion API wrapper 704 can encrypt user data or game data. The cross-promotion API wrapper 704 can also be accessed by calling, for instance, the getCrossPromo function or the checkAcceptedCrossPromo function as discussed above.

At process flow (3), the information obtained from or modified by the cross-promotion API wrapper 704 can be returned to the user session controller 702. The information can include the encrypted or otherwise obscured data and a cross-promotional offer as generated by the cross-promotion engine 320.

At process flow (4), the user session controller 702 can transmit the information obtained from or modified by the cross-promotion API wrapper 704 to the transaction manger 700 in the game client.

At process flow (5), the transaction manager 700 can transmit the information obtained from or modified by the cross-promotion API wrapper 704 to a user data object 706. In various examples, the user data object 706 contains cross promotion data for a given user. In an example, the user data object 706 includes all of the cross promotion data that represents the state for the user in all cross promotions in which the user is participating.

At process flow (6), a cross-promotional offer as obtained from the cross-promotion API wrapper 704 can be displayed, by a cross-promotion viewer 708, on the client system 308 for acceptance or rejection by the user. The cross-promotion viewer 708 can be a component of the client system 308, and can optionally include software and hardware for displaying the offer and receiving a user response to the offer.

At process flow (7), the cross-promotion viewer 708 can transmit queries to the user data object 706, such as for user data that may not have been provided to the cross-promotion viewer 708 or for other information related to a cross-promotional offer that may not initially have been presented to the user. For instance, a user might have requested details on the nature of a cross-promotional offer that may initially not have been presented to the user in order to maintain simplicity of the presentation of the offer.

At process flow (8), the cross-promotion viewer 708 can transmit cross-promotional transactional or tracking information to the transaction manager 700. The cross-promotional transactional or tracking information can include information relating to offer acceptance or rejection by a user, pendency of the offer, and any other information relating to the cross-promotional offer that a user of the system 300, 400 may have requested or might find useful.

At process flow (9), the transaction manager 700 can transmit the cross-promotional transactional or tracking information to a cross-promotion service 710 of the server 302. The cross-promotion service 710 can maintain and track the cross-promotional transactional or tracking information for the server 302.

At process flow (10), the cross-promotion service 710 can transmit the cross-promotional transaction or tracking information to the cross-promotion API wrapper 704. The cross-promotion API wrapper 704 can utilize the information as received for, for instance, generation of new cross-promotions using the cross-promotion engine 320, and/or for forwarding to a recipient.

At process flow (11), the cross-promotion API wrapper 704 can transmit the cross-promotional transaction or tracking information to an analytics database 712. The analytics database 712 can be included in the aggregator database 318, in the SQL database 418, the cache clusters 420, the data services cache clusters 422, or other locations in the systems 300, 400. The information stored in the analytics database 712 can be utilized by various components of the systems 300, 400 or by various users to assess the effectiveness of cross-promotions and generate new cross-promotions and update the rules of the cross-promotion engine 320 and the cross-promotion API 402.

Figure 8:
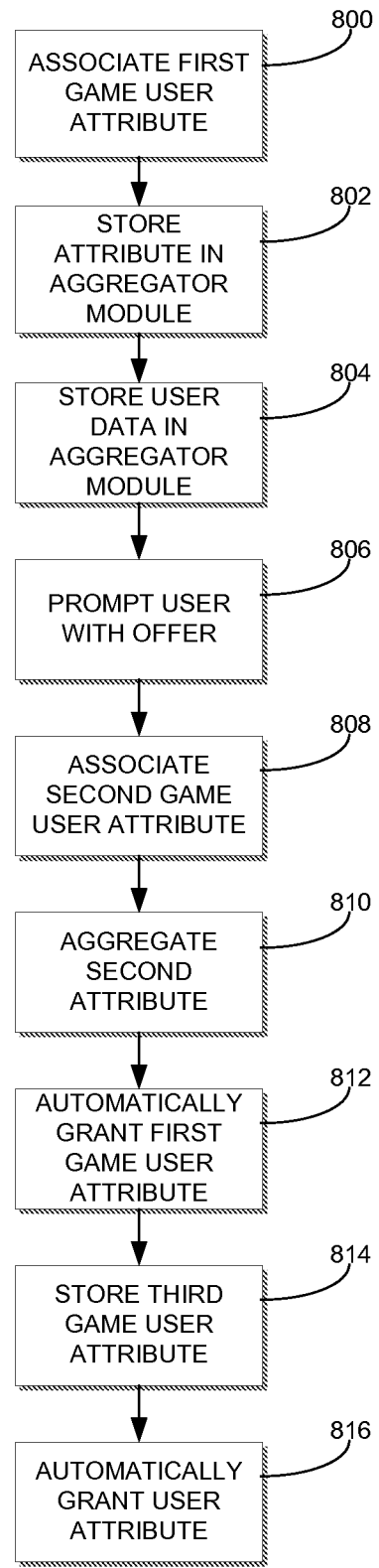
FIG. 8 is a flowchart showing a method for cross-promoting electronic games.

FIG. 8 is a flowchart showing a method for cross-promoting electronic games. The method can be implemented on systems 300, 400 or on any system or hardware that is capable of operating the steps shown.

At block 800, a first game user attribute is associated to a user based on the user playing a first electronic game. The first game user attribute can include at least one of a level of achievement within the first electronic game and a virtual item for use within the first electronic game.

At block 802, a first game user attribute associated with a user of a first electronic game is stored in an aggregator module. The aggregator module can be a component of an aggregator server and include an aggregator database. The first game user attribute can include at least one of a level of achievement within the first electronic game, a virtual item for use within the first electronic game, and user access to the first electronic game.

At block 804, user data of the user can be stored in the aggregator module. The user can include at least one of a user age, a user gender, a geographic location of the user, and a propensity of the user to engage in future game play. In various examples, the propensity of the user to engage in future game play can be based on analytics that indicate a likelihood of a user to send another use a virtual gift within an electronic game, a likelihood of a user to try a new electronic game or install a new electronic game, and a likelihood of a user to cease playing an electronic game.

At block 806, the user is prompted, via a user interface module, with an offer to associate the second game user attribute to the user, and wherein the rules module is configured to associate the second game user attribute to the user upon an acceptance of the offer by the user. The user interface module can be a component of a client system.

At block 808, a second game user attribute can be automatically associated to the user using a rules module according to a predetermined rule. The association can be based on at least one of the first game user attribute stored in the aggregator module and the user data. The rules module can include a cross-promotion engine and/or a cross-promotion API. The second game user attribute can include at least one of a level of achievement within the second electronic game, a virtual item for use within the second electronic game, and user access to the second electronic game.

Associating the second game user attribute can further be based, at least in part, on the predetermined rule and first game data. The first game data can include at least one of the first game user attribute, data relating to an amount of time the user has engaged with the first game, a version of the first electronic game, and user activities within the first electronic game. The predetermined rule can include at least one of reaching a level of achievement, increasing a metric within the first game, achieving a goal within a predetermined period of time, playing the first electronic game for a predetermined period of time, and achieving a user attribute within the first game.

At block 810, the second game user attribute associated to the user by the rules module can be aggregated in the aggregator module.

At block 812, another first game user attribute can be automatically granted to the user by the rules module based on at least some of the second game data stored in the aggregator module, the user data, and the predetermined rule. The predetermined rule can be the same predetermined rule applied at block 804 or can be a different predetermined rule, such as can be supplied by the cross-promotion engine 320. The second game user attribute can be granted to the user if the user uses, plays, or engages with the second electronic game.

At block 814, a third game user attribute relating to a third electronic game different from the first and second electronic games is automatically stored in the aggregator module.

At block 816, another one of the first, second, and third game user attributes is automatically granted to the user with the rules module further based on the first, second, and third user attributes stored in the aggregator database.

Figure 9:
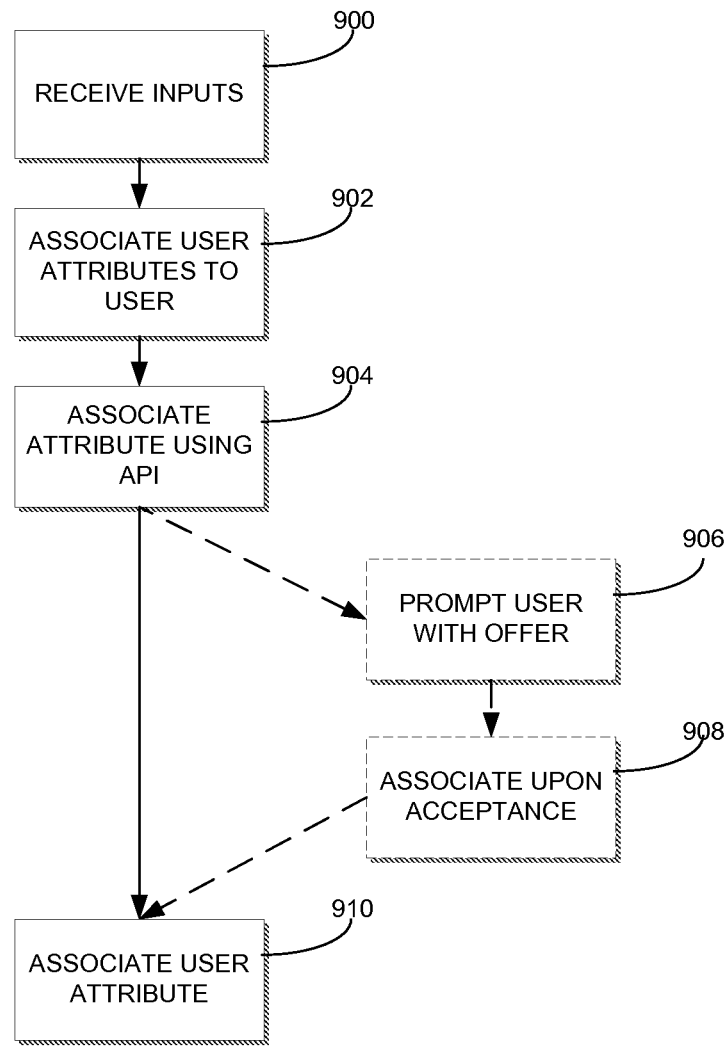
FIG. 9 is a flowchart showing a method for promoting an electronic game of several electronic games.

FIG. 9 is a flowchart showing a method for promoting an electronic game of several electronic games. The method can be implemented on systems 300, 400 or on any system or hardware that is capable of operating the steps shown.

At block 900, inputs from a user are received via a user interface. The inputs can relate to playing first and second electronic games of the electronic games.

At block 902, user attributes of the first and second electronic games are associated to the user based on the inputs. A processor can perform the association.

At block 904, a user attribute of a third electronic game that is different from the first and second electronic games is associated using an application programming interface (API) implemented on a server. The API can make the associated based, at least in part, on a rule engine implemented by the API and at least one of the user attributes of the first and second electronic games and game data of the third electronic game.

The API can optionally base association of the user attribute of the third game further based, at least in part, on a user characteristic comprising at least one of a user age, a user gender, a geographic location of the user, and a propensity of the user to engage in future game play. The user attribute can optionally comprises at least one of a level of achievement within at least one of the first and second electronic games, a virtual item for use within at least one of the first and second electronic games, and user access to at least one of the first and second electronic games.

At block 906, associating the user attribute of the third electronic game optionally comprises prompting the user, via the user interface, with an offer to associate the user attribute of the third electronic game to the user.

At block 908, associating the user attribute of the third electronic game further optionally comprises associating the user attribute of the third electronic game to the user upon an acceptance of the offer by the user.

At block 910, a user attribute of the third electronic game and a fourth electronic game different from the first and second electronic games is associated to the user, the associating based, at least in part, on the rule engine, the user attributes of the first and second electronic games, and game data of the third and fourth electronic games. The association can be based, at least in part, on the rule engine, the user attributes of the first and second electronic games, and game data of the third and fourth electronic games.

The rule engine can be configured to be applied by the API to each of the electronic games to associate a user attribute of any one of the electronic games to the user. In an example, the rule engine includes at least one of reaching a level of achievement, increasing a metric within at least one of the first and second electronic games, achieving a goal within a predetermined period of time in at least one of the first and second electronic games, playing first and second electronic games for a predetermined period of time, and achieving a cumulative goal in the first and second electronic games.

Figure 10:
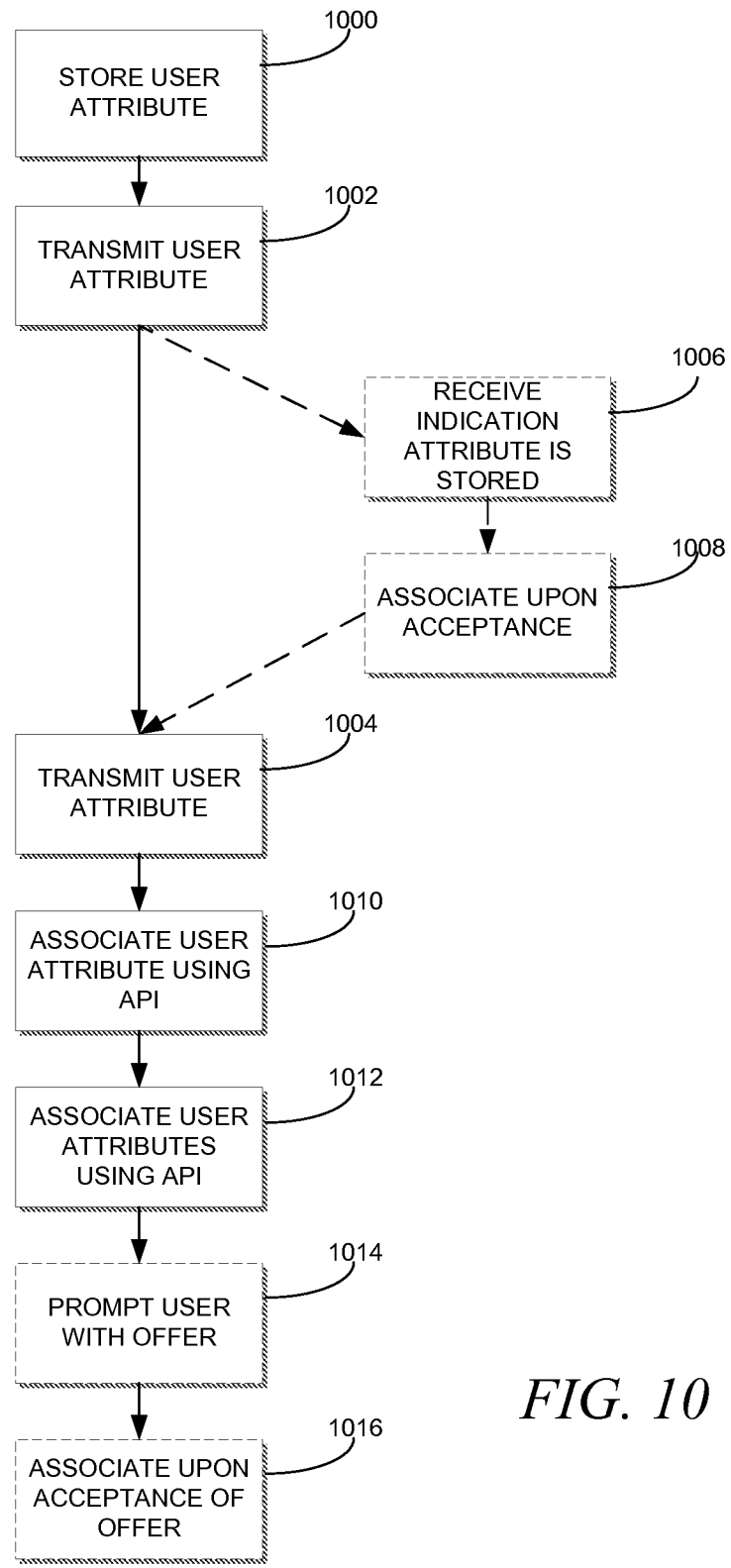
FIG. 10 is a flowchart showing a method for realtime transmission of user attributes.

FIG. 10 is a flowchart showing a method for realtime transmission of user attributes. The method can be implemented on systems 300, 400 or on any system or hardware that is capable of operating the steps shown.

At block 1000, a user attribute of a first electronic game of a plurality of electronic games is modified. The modification can be with a processor.

At block 1002, the user attribute is stored in a database associated with the first electronic game.

At block 1004, the user attribute is transmitted from the database to an aggregator database incorporating a user attribute from each of the plurality of electronic games. Transmitting the user attribute to the aggregator database can be based on storing the user attribute in the database. Transmission of the user attribute can be triggered, at least in part, by storing the user attribute in the database associated with the first electronic game.

At block 1006, the transmittal of the user attribute to the aggregator database is optionally triggered, at least in part, by the processor receiving an indication that the user attribute is stored in the database associated with the first electronic game.

At block 1008, the transmittal of the user attribute to the aggregator database is further optionally triggered, at least in part, by commanding, substantially immediately after receiving the indication, the database associated with the first electronic game to transmit the user attribute to the aggregator database.

At block 1010, a user attribute of a second electronic game of the plurality of electronic games different from the first electronic game is associated using an application programming interface (API) implemented on a server. The API can associate based, at least in part, on a rule engine implemented by the API and at least one of the user attribute of the first electronic game and game data of the second electronic game.

At block 1012, user attributes of more than one of the plurality of electronic games are associated, using the API, based, at least in part, on the rule engine, the user attributes of the more than one of the plurality of electronic games, and game data of the second electronic game. The API optionally associates the user attribute further based, at least in part, on a user characteristic comprising at least one of a user age, a user gender, a geographic location of the user, and a propensity of the user to engage in future game play The rule engine is optionally configured to be applied by the API to each of the plurality of electronic games to associate a user attribute of any one of the plurality of electronic games to the user. The rule engine optionally includes at least one of reaching a level of achievement, increasing a metric within the first electronic game, achieving a goal within a predetermined period of time in the first electronic game, playing the first electronic game a predetermined period of time, and achieving a cumulative goal in the plurality of electronic games. The user attributes optionally comprise at least one of a level of achievement within at least one of the first and second electronic games, a virtual item for use within at least one of the first and second electronic games, and user access at least one of the first and second electronic games At block 1014, associating the user attribute of the second electronic game optionally includes prompting the user, via the user interface, with an offer to associate the user attribute of the second electronic game to the user.

At block 1016, associating the user attribute of the second electronic game further optionally includes associating the user attribute of the second electronic game to the user upon an acceptance of the offer by the user.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 11:
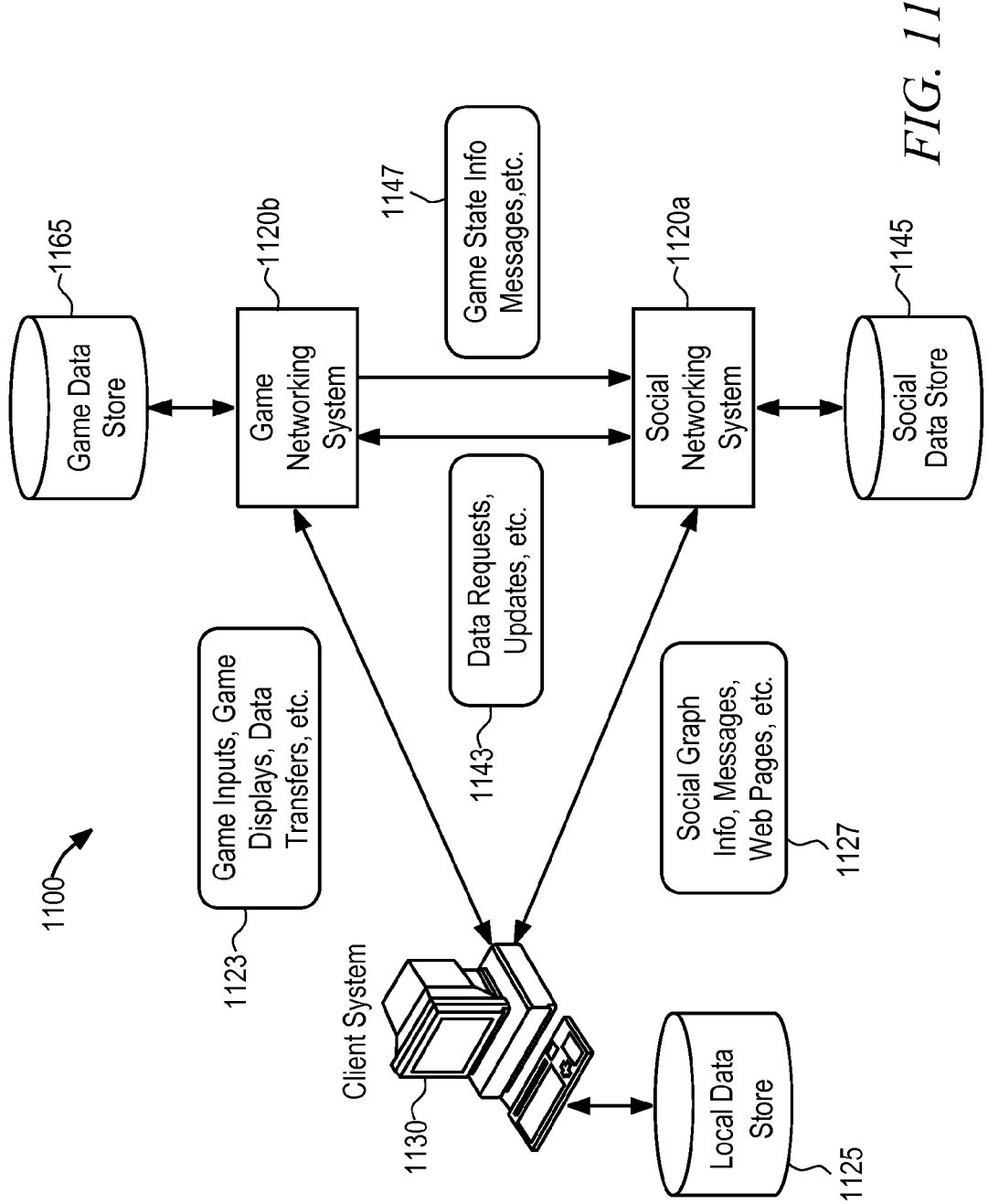
FIG. 11 is a diagrammatic representation of an example data flow between example components of the example system of FIG. 1.

FIG. 11 is a diagrammatic representation of an example data flow between example components of an example system 1100. One or more of the components of the example system 1100 may correspond to one or more of the components of the example system 100 of FIG. 1. In some embodiments, system 1100 includes a client system 1130, a social networking system 1120a, and a game networking system 1120b. The components of system 1100 can be connected to each other in any suitable configuration, using any suitable type of connection. The components may be connected directly or over any suitable network. The client system 1130, the social networking system 1120a, and the game networking system 1120b may have one or more corresponding data stores such as the local data store 1125, the social data store 1145, and the game data store 1165, respectively.

The client system 1130 may receive and transmit data 1123 to and from the game networking system 1120b. This data can include, for example, a web page, a message, a game input, a game display, a HTTP packet, a data request, transaction information, and other suitable data. At some other time, or at the same time, the game networking system 1120b may communicate data 1143, 1147 (e.g., game state information, game system account information, page info, messages, data requests, updates, etc.) with other networking systems, such as the social networking system 1120a (e.g., FACEBOOK, MYSPACE, etc.). The client system 1130 can also receive and transmit data 1127 to and from the social networking system 1120a. This data can include, for example, web pages, messages, social graph information, social network displays, HTTP packets, data requests, transaction information, updates, and other suitable data.

Communication between the client system 1130, the social networking system 1120a, and the game networking system 1120b can occur over any appropriate electronic communication medium or network using any suitable communications protocols. For example, the client system 1130, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a player accesses a virtual game on the game networking system 1120b, the BLOB containing the game state for the instance corresponding to the player may be transmitted to the client system 1130 for use by a client-side executed object to process. In some embodiments, the client-side executable is a FLASH™-based game, which can de-serialize the game state data in the BLOB. As a player plays the game, the game logic implemented at the client system 1130 maintains and modifies the various game state parameters locally. The client-side game logic may also batch game events, such as mouse clicks, and transmit these events to the game networking system 1120b. Game networking system 1120b may itself operate by retrieving a copy of the BLOB from a database or an intermediate memory cache (memcache) layer. The game networking system 1120b can also de-serialize the BLOB to resolve the game state parameters and execute its own game logic based on the events in the batch file of events transmitted by the client to synchronize the game state on the server side. The game networking system 1120*b* may then re-serialize the game state, now modified into a BLOB, and pass this to a memory cache layer for lazy updates to a persistent database.

In some embodiments, a computer-implemented game is a text-based or turn-based game implemented as a series of web pages that are generated after a player selects one or more actions to perform. The web pages may be displayed in a browser client executed on the client system 1130. For example, a client application downloaded to the client system 1130 may operate to serve a set of web pages to a player. As another example, a virtual game may be an animated or rendered game executable as a stand-alone application or within the context of a webpage or other structured document. In some embodiments, the virtual game is implemented using ADOBE™ FLASH™-based technologies. As an example, a game may be fully or partially implemented as a SWF object that is embedded in a web page and executable by a FLASH™ media player plug-in. In some embodiments, one or more described web pages is associated with or accessed by the social networking system 1120*a*. This disclosure contemplates using any suitable application for the retrieval and rendering of structured documents hosted by any suitable network-addressable resource or website.

Application event data of a game is any data relevant to the game (e.g., player inputs). In some embodiments, each application datum may have a name and a value, and the value of the application datum may change (e.g., be updated) at any time. When an update to an application datum occurs at the client system 1130, either caused by an action of a game player or by the game logic itself, the client system 1130 may need to inform the game networking system 1120*b* of the update. For example, if the game is a farming game with a harvest mechanic (such as ZYNGA™ FARMVILLE™), an event can correspond to a player clicking on a parcel of land to harvest a crop. In such an instance, the application event data may identify an event or action (e.g., harvest) and an object in the game to which the event or action applies.

In some embodiments, one or more objects of a game may be represented as any one of an ADOBE™ FLASH™ object, MICROSOFT™ SILVERLIGHT™ object, HTML 5 object, and the like. FLASH™ may manipulate vector and raster graphics, and supports bidirectional streaming of audio and video. "FLASH™" may mean the authoring environment, the player, or the application files. In some embodiments, the client system 1130 may include a FLASH™ client. The FLASH™ client may be configured to receive and run the FLASH™ application or game object code from any suitable networking system (such as, for example, the social networking system 1120*a* or the game networking system 1120*b*). In some embodiments, the FLASH™ client is run in a browser client executed on the client system 1130. A player can interact with FLASH™ objects using the client system 1130 and the FLASH™ client. The FLASH™ objects can represent a variety of in-game objects. Thus, the player may perform various in-game actions on various in-game objects by making various changes and updates to the associated FLASH™ objects.

In some embodiments, in-game actions are initiated by clicking or similarly interacting with a FLASH™ object that represents a particular in-game object. For example, a player can interact with a FLASH™ object to use, move, rotate, delete, attack, shoot, or harvest an in-game object. This disclosure contemplates performing any suitable in-game action by interacting with any suitable FLASH™ object. In some embodiments, when the player makes a change to a FLASH™ object representing an in-game object, the client-executed game logic may update one or more game state parameters associated with the in-game object. To ensure synchronization between the FLASH™ object shown to the player at the client system 1130, the FLASH™ client may send the events that caused the game state changes to the in-game object to the game networking system 1120*b*. However, to expedite the processing and hence the speed of the overall gaming experience, the FLASH™ client may collect a batch of some number of events or updates into a batch file. The number of events or updates may be determined by the FLASH™ client dynamically or determined by the game networking system 1120*b* based on server loads or other factors. For example, client system 1130 may send a batch file to the game networking system 1120*b* whenever 50 updates have been collected or after a threshold period of time, such as every minute.

As used herein, the term "application event data" may refer to any data relevant to a computer-implemented virtual game application that may affect one or more game state parameters, including, for example and without limitation, changes to player data or metadata, changes to player social connections or contacts, player inputs to the game, and events generated by the game logic. In some embodiments, each application datum has a name and a value. The value of an application datum may change at any time in response to the gameplay of a player or in response to the game engine (e.g., based on the game logic). In some embodiments, an application data update occurs when the value of a specific application datum is changed.

In some embodiments, when a player plays a virtual game on the client system 1130, the game networking system 1120*b* serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular player and a particular virtual game. In some embodiments, while a player is not playing the virtual game, the corresponding BLOB may be stored in the database. This enables a player to stop playing the game at any time without losing the current state of the game the player is in. When a player resumes playing the game next time, game networking system 1120*b* may retrieve the corresponding BLOB from the database to determine the most-recent values of the game-related data. In some embodiments, while a player is playing the virtual game, the game networking system 1120*b* also loads the corresponding BLOB into a memory cache so that the game system may have faster access to the BLOB and the game-related data contained therein.

Figure 12:
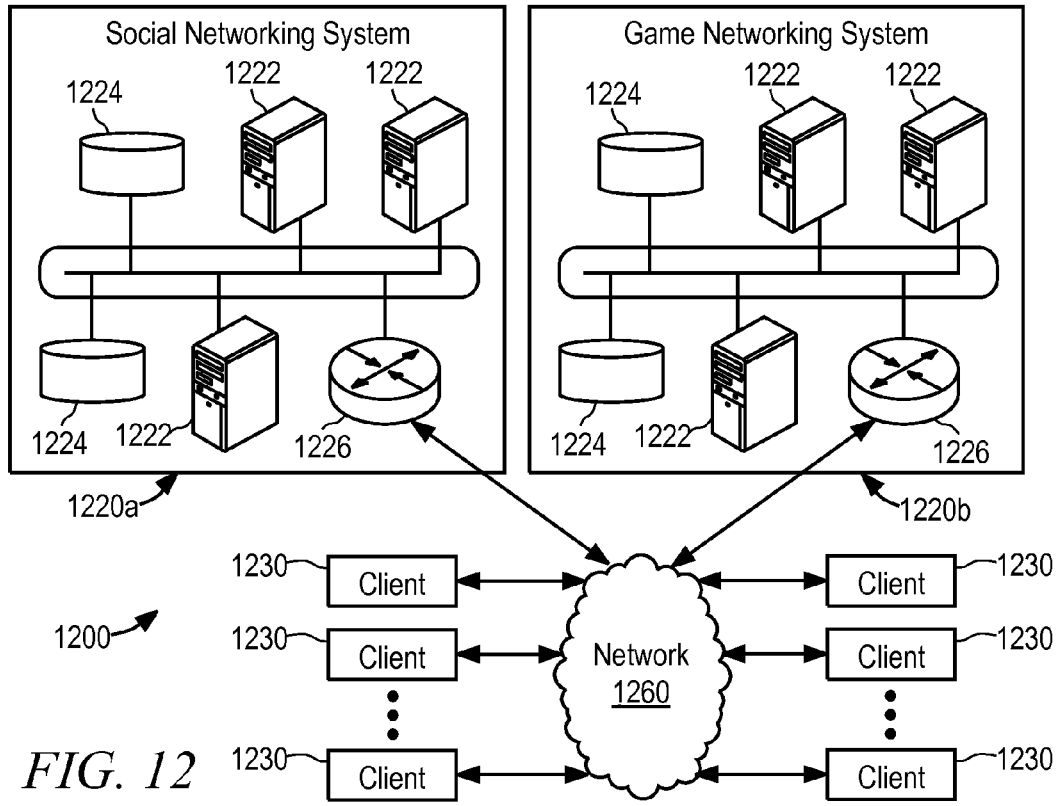
FIG. 12 is a schematic diagram showing an example network environment, in which various example embodiments may operate.

Various embodiments may operate in a WAN environment, such as the Internet, including multiple network addressable systems. FIG. 12 is a schematic diagram showing an example network environment 1200, in which various example embodiments may operate. Network cloud 1260 generally represents one or more interconnected networks, over which the systems and hosts described herein can communicate. Network cloud 1260 may include packet-based WANs (such as the Internet), private networks, wireless networks, satellite networks, cellular networks, paging networks, and the like. As FIG. 12 illustrates, various embodiments may operate in a network environment 1200 comprising one or more networking systems, such as a social networking system 1220*a*, a game networking system 1220*b*, and one or more client systems 1230. The components of the social networking system 1220*a* and the game networking system 1220*b* operate analogously; as such, hereinafter they may be referred to simply as the networking system 1220. The client systems 1230 are operably connected to the network environment 1200 via a network service provider, a wireless carrier, or any other suitable means.

The networking system 1220 is a network addressable system that, in various example embodiments, comprises one or more physical servers 1222 and data stores 1224. The one or more physical servers 1222 are operably connected to computer network cloud 1260 via, by way of example, a set of routers and/or networking switches 1226. In an example embodiment, the functionality hosted by the one or more physical servers 1222 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), FLASH™, ActionScript, and the like.

The physical servers 1222 may host functionality directed to the operations of the networking system 1220. Hereinafter servers 1222 may be referred to as server 1222, although the server 1222 may include numerous servers hosting, for example, the networking system 1220, as well as other content distribution servers, data stores, and databases. Data store 1224 may store content and data relating to, and enabling, operation of, the networking system 1220 as digital data objects. A data object, in some embodiments, is an item of digital information typically stored or embodied in a data file, database, or record. Content objects may take many forms, including: text (e.g., ASCII, SGML, HTML), images (e.g., JPEG, TIF and GIF), graphics (vector-based or bitmap), audio, video (e.g., MPEG), or other multimedia, and combinations thereof. Content object data may also include executable code objects (e.g., games executable within a browser window or frame), podcasts, and the like.

Logically, data store 1224 corresponds to one or more of a variety of separate and integrated databases, such as relational databases and object-oriented databases, that maintain information as an integrated collection of logically related records or files stored on one or more physical systems. Structurally, data store 1224 may generally include one or more of a large class of data storage and management systems. In some embodiments, data store 1224 may be implemented by any suitable physical system(s) including components, such as one or more database servers, mass storage media, media library systems, storage area networks, data storage clouds, and the like. In one example embodiment, data store 1224 includes one or more servers, databases (e.g., MySQL), and/or data warehouses. Data store 1224 may include data associated with different networking system 1220 users and/or client systems 1230.

The client system 1230 is generally a computer or computing device including functionality for communicating (e.g., remotely) over a computer network. The client system 1230 may be a desktop computer, laptop computer, PDA, in- or out-of-car navigation system, smart phone or other cellular or mobile phone, or mobile gaming device, among other suitable computing devices. Client system 1230 may execute one or more client applications, such as a Web browser.

When a user at a client system 1230 desires to view a particular webpage (hereinafter also referred to as target structured document) hosted by the networking system 1220, the user's web browser, or other document rendering engine or suitable client application, formulates and transmits a request to the networking system 1220. The request generally includes a URL or other document identifier as well as metadata or other information. By way of example, the request may include information identifying the user, a timestamp identifying when the request was transmitted, and/or location information identifying a geographic location of the user's client system 1230 or a logical network location of the user's client system 1230.

Although the example network environment 1200 described above and illustrated in FIG. 12 is described with respect to the social networking system 1220a and the game networking system 1220b, this disclosure encompasses any suitable network environment using any suitable systems. For example, a network environment may include online media systems, online reviewing systems, online search engines, online advertising systems, or any combination of two or more such systems.

Figure 13:
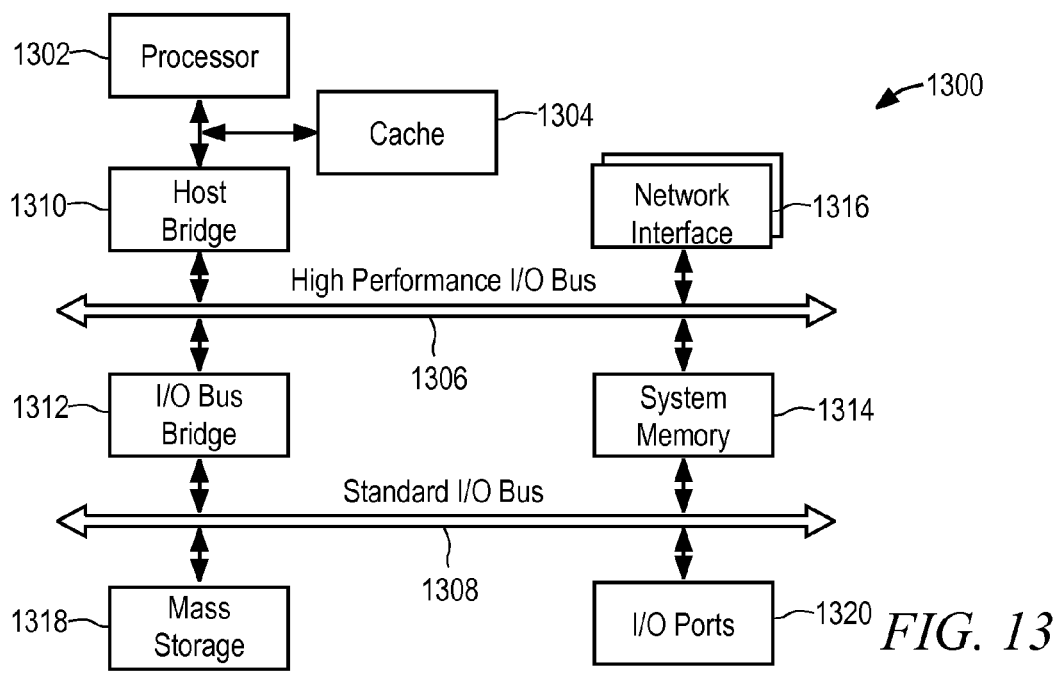
FIG. 13 is a block diagram illustrating an example computing system architecture, which may be used to implement one or more of the methodologies described herein.

FIG. 13 is a block diagram illustrating an example computing system architecture, which may be used to implement a server 1222 or a client system 1230 both of FIG. 12. In one embodiment, the hardware system 1300 comprises a processor 1302, a cache memory 1304, and one or more executable modules and drivers, stored on a tangible computer-readable storage medium, directed to the functions described herein. Additionally, the hardware system 1300 may include a high performance input/output (I/O) bus 1306 and a standard I/O bus 1308. A host bridge 1310 may couple the processor 1302 to the high performance I/O bus 1306, whereas the I/O bus bridge 1312 couples the two buses 1306 and 1308 to each other. A system memory 1314 and one or more network/communication interfaces 1316 may couple to the bus 1306. The hardware system 1300 may further include video memory (not shown) and a display device coupled to the video memory. Mass storage 1318 and I/O ports 1320 may couple to the bus 1308. The hardware system 1300 may optionally include a keyboard, a pointing device, and a display device (not shown) coupled to the bus 1308. Collectively, these elements are intended to represent a broad category of computer hardware systems.

The elements of the hardware system 1300 are described in greater detail below. In particular, the network interface 1316 provides communication between the hardware system 1300 and any of a wide range of networks, such as an Ethernet (e.g., IEEE 802.3) network, a backplane, and the like. The mass storage 1318 provides permanent storage for the data and programming instructions to perform the above-described functions implemented in servers 1222 of FIG. 12, whereas system memory 1314 (e.g., DRAM) provides temporary storage for the data and programming instructions when executed by the processor 1302. I/O ports 1320 are one or more serial and/or parallel communication ports that provide communication between additional peripheral devices, which may be coupled to the hardware system 1300.

The hardware system 1300 may include a variety of system architectures, and various components of the hardware system 1300 may be rearranged. For example, cache memory 1304 may be on-chip with the processor 1302. Alternatively, the cache memory 1304 and the processor 1302 may be packed together as a "processor module," with processor 1302 being referred to as the "processor core." Furthermore, certain embodiments of the present disclosure may neither require nor include all of the above components. For example, the peripheral devices shown coupled to the standard I/O bus 1308 may couple to the high performance I/O bus 1306. In addition, in some embodiments, only a single bus may exist, with the components of the hardware system 1300 being coupled to the single bus. Furthermore, the hardware system 1300 may include additional components, such as additional processors, storage devices, or memories.

An operating system manages and controls the operation of the hardware system 1300, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features, and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A system, comprising:
a first electronic game database configured to store first game user attributes relating to a first electronic game;
a second electronic game database configured to store second game user attributes relating to a second electronic game different from the first electronic game; an aggregator database communicatively coupled to the first and second electronic game databases, the aggregator database configured to store a first game user attribute, associated with a user of the a first electronic game the user and relating to the first electronic game, electronic game, and further configured to store user data of the user of the first electronic game; and
a processor communicatively coupled to the aggregator database and configured to automatically provide associate a second game user attribute to the user according to a predetermined rule based on at least one of:
the first game user attribute stored in the aggregator database; and
the user data;
wherein the second game user attribute provided to the user by the processor is stored in the aggregator database; and
wherein the processor is configured to automatically provide another first game user attribute to the user based on the second game user attribute stored in the aggregator database, the user data, and the predetermined rule.

2. The system of claim 1, wherein the first and second game user attributes comprise at least one of a level of achievement within a respective electronic game, a virtual item for use within the respective electronic game, and user access to the respective electronic game.

3. The system of claim 2, wherein an additional first game user attribute is provided to the user based on the user playing the first electronic game.

4. The system of claim 2:
wherein the first and second electronic game databases are further configured to store first and second game data, respectively, the first and second game data comprising the respective first and second game attributes and at least one of:
data relating to an amount of time the user has engaged with the respective first and second electronic games;
a version of the respective first and second electronic games; and
user activities within the respective first and second electronic games; and
wherein the processor is configured to automatically provide the second game user attribute to the user based, at least in part, on the predetermined rule and the first game data.

5. The system of claim 4, wherein the user data is at least one of a user age, a user gender, a geographic location of the user, and a propensity of the user to engage in future game play.

6. The system of claim 5, wherein the predetermined rule comprises at least one of reaching the level of achievement, increasing a metric within the first game, achieving a goal within a predetermined period of time, playing the first electronic game for a predetermined period of time, and achieving one or more of the first game user attributes within the first electronic game.

7. The system of claim 1, further comprising a third electronic game database communicatively coupled to the first and second electronic game databases and the aggregator database and configured to store a third game user attribute relating to a third electronic game different from the first and second electronic games;
wherein the aggregator database is configured to store the third game user attribute; and
wherein the processor is configured to automatically provide another one of the first, second, and third game user attributes to the user further based on the first, second, and third user attributes stored in the aggregator database.

8. The system of claim 7, wherein the predetermined rule comprises at least one of reaching a level of achievement, increasing a metric within any one of the first, second and third games, achieving a goal within a predetermined period of time, achieving a goal in at least two of the first, second, and third games, and achieving a cumulative goal in at least two of the first, second, and third games.

9. A system, comprising:
a hardware-implemented aggregator module to configured to aggregate a first game user attribute relating to a first electronic game and a second game user attribute relating to a second electronic game, the first game user attribute associated with a user of the first electronic game, and further configured to store user data of the user; and
a hardware-implemented rules module configured to automatically provide a second game user attribute to the user according to a predetermined rule based on:
the first game user attribute stored in the hardware-implemented aggregator database; and
the user data;
wherein the second game user attribute assigned associated to the user by the hardware-implemented rules module is stored by the hardware-implemented aggregator module; and
wherein the hardware-implemented rules module is configured to automatically provide another first game user attribute to the user based on the second game user attribute stored in the hardware-implemented aggregator module, the user data, and the predetermined rule.

10. The system of claim 9, wherein the first and second game user attributes comprise at least one of a level of achievement within a respective electronic game, a virtual item for use within the respective electronic game, and user access to the respective electronic game.

11. The system of claim 10, wherein the hardware-implemented rules module is configured to provide an additional first game user attribute to the user based on the user playing the first electronic game.

12. The system of claim 10:
wherein the first and second game data comprise the respective first and second game user attributes and at least one of:
data relating to an amount of time the user has engaged with the respective first and second electronic games;
a version of the respective first and second electronic games; and
user activities within the respective first and second electronic games; and
wherein the hardware-implemented rules module is configured to automatically provide the second game user attribute to the user based, at least in part, on the predetermined rule and the first game data.

13. The system of claim 12, wherein the user data is at least one of a user age, a user gender, a geographic location of the user, and a propensity of the user to engage in future game play.

14. The system of claim 13, wherein the predetermined rule comprises at least one of reaching the level of achievement, increasing a metric within the first game, achieving a goal within a predetermined period of time, playing the first electronic game for a predetermined period of time, and achieving one or more of the first game user attributes within the first electronic game.

15. The system of claim 9, wherein the hardware-implemented aggregator module is configured to store a third game user attribute relating to a third electronic game different from the first and second electronic games; and wherein the hardware-implemented rules module is configured to automatically provide another one of the first, second, and third game user attributes to the user further based on the first, second, and third user attributes stored in the hardware-implemented aggregator database.

16. The system of claim 15, wherein the predetermined rule comprises at least one of reaching a level of achievement, increasing a metric within any one of the first, second and third games, achieving a goal within a predetermined period of time, achieving a goal in at least two of the first, second, and third games, and achieving a cumulative goal in at least two of the first, second, and third games.

17. A method for cross-promoting electronic games, comprising:
storing, in a hardware-implemented aggregator module, a first game user attribute associated with a user of a first electronic game;
storing, in the hardware-implemented aggregator module, user data of the user;
automatically providing, using a hardware-implemented rules module, a second game user attribute to the user according to a predetermined rule based on at least one of:
the first game user attribute stored in the hardware-implemented aggregator module; and
the user data;
storing, in the hardware-implemented aggregator module, a second game user attribute provided to the user by the hardware-implemented rules module; and
automatically providing, with the hardware-implemented rules module, another first game user attribute to the user based on the second game user attribute stored in the hardware-implemented aggregator module, the user data, and the predetermined rule.

18. The method of claim 17, wherein the first and second game user attributes comprise at least one of a level of achievement within a respective electronic game, a virtual item for use within the respective electronic game, and user access to the respective electronic game.

19. The method of claim 18, further comprising providing, with the hardware-implemented rules module, an additional first game user attribute to the user based on the user playing the first electronic game.

20. The method of claim 18:
wherein first and second game data comprise the respective first and second game user attributes and at least one of:
data relating to an amount of time the user has engaged with the respective first and second electronic games;
a version of the respective first and second electronic games; and
user activities within the respective first and second electronic games; and
wherein the automatic providing, with the hardware-implemented rules module, of the second game user attribute to the user is based, at least in part, on the predetermined rule and the first game data.

21. The method of claim 20, wherein the user data is at least one of a user age, a user gender, a geographic location of the user, and a propensity of the user to engage in future game play.

22. The system of claim 21, wherein the predetermined rule comprises at least one of reaching the level of achievement, increasing a metric within the first game, achieving a goal within a predetermined period of time, playing the first electronic game for a predetermined period of time, and achieving one or more of the first game user attributes within the first electronic game.

23. The method of claim 17, further comprising storing, in the hardware-implemented aggregator module, a third game user attribute relating to a third electronic game different from the first and second electronic games; and automatically providing, with the hardware-implemented rules module, another one of the first, second, and third game user attributes to the user further based on the first, second, and third user attributes stored in the hardware-implemented aggregator database.

24. The method of claim 23, wherein the predetermined rule comprises at least one of reaching a level of achievement, increasing a metric within any one of the first, second and third games, achieving a goal within a predetermined period of time, achieving a goal in at least two of the first, second, and third games, and achieving a cumulative goal in at least two of the first, second, and third games.

25. A system comprising:
a network adaptor configured to send and receive data packets over a network;
a processor communicatively coupled to the network adaptor; and
a storage medium, the storage medium communicatively coupled to the processor and including instructions which, when performed on the processor, cause the processor to:

store, in an aggregator module, a first game user attribute associated with a user of a first electronic game;

store, in the aggregator module, user data of the user;

automatically provide, using a rules module, a second game user attribute to the user according to a predetermined rule based on:
- the first game user attribute stored in the aggregator module; and
- the user data;

store, in the aggregator module, the second game user attribute automatically provided to the user by the rules module; and automatically provide, with the rules module, another first game user attribute to the user based on the second game user attribute stored in the aggregator module, the user data, and the predetermined rule.

26. The system of claim 25, wherein the first and second game user attributes comprise at least one of a level of achievement within a respective electronic game, a virtual item for use within the respective electronic game, and user access to the respective electronic game.

27. The system of claim 26, wherein the storage medium further includes instructions to provide an additional first game user attribute to the user based on the user playing the first electronic game.

28. The system of claim 26:
wherein the first and second game data comprise the respective first and second game user attributes and at least one of:
- data relating to an amount of time the user has engaged with the respective first and second electronic games;
- a version of the respective first and second electronic games; and
- user activities within the respective first and second electronic games; and wherein the second game user attribute is automatically provided to the user based, at least in part, on the predetermined rule and the first game data.

29. The system of claim 28, wherein the user data is at least one of a user age, a user gender, a geographic location of the user, and a propensity of the user to engage in future game play.

30. The system of claim 29, wherein the predetermined rule comprises at least one of reaching the level of achievement, increasing a metric within the first game, achieving a goal within a predetermined period of time, playing the first electronic game for a predetermined period of time, and achieving one or more of the first game user attributes within the first electronic game.

31. The system of claim 25, wherein the storage medium further includes instructions to:
store, in the aggregator module, a third game user attribute relating to a third electronic game different from the first and second electronic games; and automatically provide, with the rules module, another one of the first, second, and third game user attributes to the user further based on the first, second, and third user attributes stored in the aggregator database.

32. The system of claim 31, wherein the predetermined rule comprises at least one of reaching a level of achievement, increasing a metric within any one of the first, second and third games, achieving a goal within a predetermined period of time, achieving a goal in at least two of the first, second, and third games, and achieving a cumulative goal in at least two of the first, second, and third games.

\* \* \* \* \*